(12) United States Patent
Nakamura et al.

(10) Patent No.: US 8,706,892 B2
(45) Date of Patent: Apr. 22, 2014

(54) COMMUNICATION SYSTEM AND SERVER

(75) Inventors: Shota Nakamura, Kawasaki (JP); Eri Kawai, Yokohama (JP); Takuma Utsunomiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 977 days.

(21) Appl. No.: 12/688,802

(22) Filed: Jan. 15, 2010

(65) Prior Publication Data
US 2010/0235516 A1 Sep. 16, 2010

(30) Foreign Application Priority Data

Mar. 11, 2009 (JP) ................................ 2009-057473

(51) Int. Cl.
| G06F 11/00 | (2006.01) |
| H04H 20/71 | (2008.01) |
| H04W 4/00 | (2009.01) |
| H04L 12/66 | (2006.01) |
| G06F 15/16 | (2006.01) |
| G06F 15/173 | (2006.01) |

(52) U.S. Cl.
USPC ........... 709/230; 370/221; 370/312; 370/328; 370/329; 370/352; 709/206; 709/219; 709/226; 709/227; 709/228; 709/238; 709/245

(58) Field of Classification Search
None
See application file for complete search history.

(56) References Cited

U.S. PATENT DOCUMENTS

| 7,171,478 | B2 * | 1/2007 | Lueckhoff et al. ............ 709/227 |
| 7,920,499 | B2 * | 4/2011 | Isomaki et al. ................ 370/312 |
| 8,144,702 | B1 | 3/2012 | Miyajima et al. |
| 2003/0093563 | A1 * | 5/2003 | Young et al. ................... 709/245 |
| 2004/0196506 | A1 * | 10/2004 | Izumi et al. .................... 358/402 |
| 2005/0044188 | A1 * | 2/2005 | Nakazawa et al. ............. 709/219 |
| 2005/0198320 | A1 * | 9/2005 | Chou et al. ..................... 709/228 |
| 2005/0226225 | A1 * | 10/2005 | Shigeta .......................... 370/352 |
| 2006/0059025 | A1 | 3/2006 | Kato et al. |

(Continued)

FOREIGN PATENT DOCUMENTS

| CN | 1757019 A | 4/2006 |
| JP | 2003-258999 A | 9/2003 |

(Continued)

OTHER PUBLICATIONS

European Patent Office Search Report on Application No. EP 10 15 1177 dated Jul. 7, 2010; 2 pages.

(Continued)

*Primary Examiner* — Moustafa M Meky
*Assistant Examiner* — Ho Shiu
(74) *Attorney, Agent, or Firm* — Foley & Lardner LLP

(57) ABSTRACT

A SOAP-SIP adapter 2 establishes a session with the terminals 5b and 5c in accordance with a SIP. At this time, the SOAP-SIP adapter 2 sends an INVITE message including its own IP address and port number to the terminals 5b and 5c. Each terminal 5b, 5c sends a 200 OK including its own IP address and port number to the SOAP-SIP adapter 2. The SOAP-SIP adapter 2 stores correspondingly the IP address and port number of each terminal 5b, 5c in a memory. The SOAP-SIP adapter 2 transfers a media stream received from each terminal 5b, 5c to the destination of the corresponding IP address and port number by referring to the memory. Also, a pseudo RBT is sent to the terminal A5b from establishing the session with the terminal A5b till establishing the session with the terminal B5c to prevent a silent state.

6 Claims, 31 Drawing Sheets

(56) References Cited

U.S. PATENT DOCUMENTS

| | | | |
|---|---|---|---|
| 2006/0133385 A1* | 6/2006 | Trossen et al. | 370/395.52 |
| 2006/0136596 A1* | 6/2006 | Izumi | 709/230 |
| 2006/0230168 A1* | 10/2006 | Sung et al. | 709/230 |
| 2006/0274730 A1* | 12/2006 | Medlock et al. | 370/352 |
| 2007/0041525 A1* | 2/2007 | Tingley et al. | 379/88.17 |
| 2007/0041528 A1* | 2/2007 | Menon et al. | 379/90.01 |
| 2007/0081518 A1* | 4/2007 | Jain et al. | 370/352 |
| 2007/0206620 A1* | 9/2007 | Cortes et al. | 370/412 |
| 2007/0291301 A1* | 12/2007 | Ozawa et al. | 358/1.15 |
| 2008/0022014 A1* | 1/2008 | Peters et al. | 709/246 |
| 2008/0071914 A1 | 3/2008 | Kimura et al. | |
| 2008/0247381 A1* | 10/2008 | Bohm et al. | 370/352 |
| 2009/0006637 A1* | 1/2009 | George et al. | 709/230 |
| 2009/0041034 A1* | 2/2009 | Boucadair et al. | 370/400 |
| 2009/0070469 A1* | 3/2009 | Roach et al. | 709/226 |
| 2009/0110171 A1* | 4/2009 | Kannan et al. | 379/207.16 |
| 2009/0168778 A1* | 7/2009 | Ahmed et al. | 370/392 |
| 2009/0172776 A1* | 7/2009 | Makagon et al. | 726/2 |
| 2009/0219953 A1* | 9/2009 | Benco et al. | 370/487 |
| 2009/0245183 A1* | 10/2009 | Baker et al. | 370/329 |
| 2009/0265434 A1* | 10/2009 | Benc et al. | 709/206 |
| 2009/0296567 A1* | 12/2009 | Yasrebi et al. | 370/221 |
| 2009/0304025 A1* | 12/2009 | Boucadair et al. | 370/466 |
| 2010/0046499 A1* | 2/2010 | Hu et al. | 370/352 |
| 2010/0312901 A1* | 12/2010 | Noyranen et al. | 709/228 |
| 2011/0149838 A1* | 6/2011 | Gallagher et al. | 370/328 |
| 2011/0264824 A1* | 10/2011 | Venkata Subramanian et al. | 709/238 |

FOREIGN PATENT DOCUMENTS

| | | |
|---|---|---|
| JP | 2006-350635 | 12/2006 |
| JP | 2006-350635 A | 12/2006 |
| JP | 2007-065970 | 3/2007 |
| JP | 2007-067544 A | 3/2007 |
| JP | 2007-318707 | 12/2007 |
| JP | 2008-078878 | 4/2008 |
| JP | 2008-078878 A | 4/2008 |
| JP | 2008-236297 A | 10/2008 |
| JP | 2008-301228 A | 12/2008 |

OTHER PUBLICATIONS

Rosenberg, J.; A Framework for Conferencing with the Session Initiation Protocol (SIP); Feb. 2006; pp. 1-29; The Internet Society.

Rosenberg, J., et al. Best Current Practices for Third Party Call Control (3pcc) in the Session Initiation Protocol (SIP); Apr. 2004; pp. 1-31; The Internet Society.

Open Service Access (OSA); Parlay X Web Services; Part 2: third Party Call (Parlay X3); draft ETSI ES 202 504-2 v.0.0.5 (Jun. 2007); pp. 1-20.

Sawada, Takuya, et al.; Practical Introduction to Network, Practice Detailed Explanation Text of SIP; first edition Session Initiation Protocol, Aug. 2, 2007; pp. 351-353.

Japan Patent Office Notification of Reasons for Refusal on application 2011-153044 mailed Aug. 6, 2013; pp. 1-3.

* cited by examiner

| | 2010 | 2010_1 ... | 2010_n |
|---|---|---|---|
| 2011 | sessionID | 123456 | |
| 2012 | SESSION STATE | CONNECTED | |
| 2020 | CALL PARTICIPANT STATE | ※ FIG. 3B | |
| 2030_A | TERMINAL INFORMATION (FOR CLIENT A) | ※ FIG. 3C | |
| 2030_B | TERMINAL INFORMATION (FOR CLIENT B) | ※ FIG. 3C | |

FIG. 3A

| | | 2020_A | 2020_B |
|---|---|---|---|
| 2020 | URI | sip:2222222222@clientA.com | sip:3333333333@clientB.com |
| 2021 | CALL STATE | CallParticipantConnected | CallParticipantConnected |
| 2022 | START TIME | 2008.10.22 10:30:30 | 2008.10.22 10:30:45 |
| 2023 | | | |

FIG. 3B

| | 2030_A | 2030_B |
|---|---|---|
| HANDLE VALUE | 987654 | 765432 |
| sessionID | 123456 | 123456 |
| TERMINAL STATE | CallComplete | CallComplete |
| ROLE | UA-A | UA-B |
| SEND SDP INFORMATION | ....<br>10.0.1.1  10000 | ....<br>10.0.1.1  10000 |
| RECV SDP INFORMATION | ....<br>10.0.2.1  20000 | ....<br>10.0.2.2  30000 |
| FROM URI | sip:1111111111@SSA.com | sip:1111111111@SSA.com |
| TO URI | sip:2222222222@clientA.com | sip:3333333333@clientB.com |

FIG. 3C

| | 2040 | 2040_1 ... | 2040_n |
|---|---|---|---|
| 2041 | sessionID | 123456 | |
| 2042 | MEDIA STREAM SENDING/RECEIVING IP ADDRESS | 10.0.1.1 | |
| 2043 | MEDIA STREAM SENDING/RECEIVING PORT NUMBER | 10000 | |
| 2044 | PARTNER IP ADDRESS 1 | 10.0.2.1 | |
| 2045 | PARTNER PORT NUMBER 1 | 20000 | |
| 2046 | PARTNER IP ADDRESS 2 | 10.0.2.2 | |
| 2047 | PARTNER PORT NUMBER 2 | 30000 | |

FIG. 3D

|  | 5020 | 5020_1 | ... 5020_n |
|---|---|---|---|
| 5021 | HANDLE VALUE | 987654 | |
| | connectionID | 123456 | |
| 5022 | TERMINAL STATE | CallComplete | |
| 5023 | SEND SDP INFORMATION | .... 10.0.1.1 10000 | |
| 5024 | RECV SDP INFORMATION | .... 10.0.2.1 20000 | |
| 5025 | FROM URI | sip:2222@SSA.com | |
| 5026 | TO URI | sip:1111@SSA.com | |
| 5027 | | | |

FIG. 6B

| | 5030 | 5030_1 ... | 5030_n |
|---|---|---|---|
| 5031 | connectionID | 123456 | |
| | MEDIA STREAM SENDING/RECEIVING IP ADDRESS | 10.0.1.1 | |
| 5032 | MEDIA STREAM SENDING/RECEIVING PORT NUMBER | 10000 | |
| 5033 | PARTNER IP ADDRESS 1 | 10.0.2.1 | |
| 5034 | PARTNER PORT NUMBER 1 | 20000 | |
| 5035 | PARTNER IP ADDRESS 2 | 192.168.10.1 | |
| 5036 | PARTNER PORT NUMBER 2 | 30000 | |
| 5037 | | | |

FIG. 6C

| | 6030 | 6030_1 | ... | 6030_n |
|---|---|---|---|---|
| 6031 | connectionID | 987654 | | |
| 6032 | MEDIA STREAM SENDING/RECEIVING IP ADDRESS | 10.0.2.1 | | |
| 6033 | MEDIA STREAM SENDING/RECEIVING PORT NUMBER | 20000 | | |
| 6034 | PARTNER IP ADDRESS 1 | 10.0.1.1 | | |
| 6035 | PARTNER PORT NUMBER 1 | 10000 | | |
| 6036 | PARTNER IP ADDRESS 2 | 192.168.10.2 | | |
| 6037 | PARTNER PORT NUMBER 2 | 40000 | | |

FIG. 21C

COMMUNICATION SYSTEM AND SERVER

CLAIM OF PRIORITY

The present application claims priority from Japanese patent application JP 2009-057473 filed on Mar. 11, 2009, the content of which is hereby incorporated by reference into this application.

BACKGROUND OF THE INVENTION

1. Field of the Invention

The present invention relates to a communication system and a server, and more particularly to a communication system and a server with an action points connection method in the next generation network.

2. Description of the Related Art

In recent years, various examinations for the communication network of the next generation with the common carrier using an Internet Protocol (IP) technique have been vigorously made. The next generation communication network of this kind is called an Next Generation Network (NGN). In the NGN, a method for establishing a session between the server and the client to be communicated and managing the band for each session is often employed. Also, in the NGN, a session control protocol for use in reserving the band is a Session Initiation Protocol (SIP), for example.

Also, there has been disclosed another technique in which when a client apparatus mounting no control protocol for the session for reserving the band communicates in a band assured network, a session substituting device establishes the session for reserving the band in the band assured network, instead of the client apparatus (e.g., refer to JP-A-2008-78878).

Also, a Simple Object Access Protocol (SOAP) for exchanging the information between applications has been known.

SUMMARY OF THE INVENTION

In the NGN, it is required that the IP addresses for establishing the signaling channel and the data channel are the same. Therefore, there is a problem that it is impossible to substitute the establishment of the data channel between two parties (first connection terminal and second connection terminal) to be communicated such as the conventional 3rd Party Call Control (3PCC) service flow. Also, there is another problem in the 3PCC service flow that when the telephone communication is made between the first connection terminal and the second connection terminal by firstly establishing the session between an apparatus with the 3PCC and the first connection terminal and then establishing the session between the apparatus with the 3PCC and the second connection terminal, the first connection terminal is placed in a silent state at the stage where the establishment of the session with the first connection terminal is completed and the establishment of the session with the second connection terminal is started. Also, most of the existent application terminals have no SIP for reserving the communication band in the NGN, in which there is another problem that the communication on the NGN is impossible.

In view of the above-mentioned problems, it is an object of the present invention to provide a communication system and a server for transferring the data between two parties (first connection terminal and second connection terminal) to be communicated in the NGN with assured communication quality. Also, it is another object of the invention to provide a 3PCC service on the NGN with assured communication quality. It is still another object of the invention to prevent the first connection terminal from being placed in the silent state in establishing the session with the second connection terminal after establishing the session with the first connection terminal in the 3PCC service flow.

Further, it is another object of the invention to provide a communication system and a server in which the terminal can reserve the communication band on the NGN with the partner terminal without being aware of the SIP and communicate on the NGN with reserved band through the steady operation on the already existent internet after reserving the communication band. Also, it is another object of the invention to mount an interface capable of establishing many sessions on an SOAP-SIP adapter to make it possible to establish hundreds to thousands of sessions.

According to the first solving means of present invention, there is provided a communication system having a first server, a device for making an establishment of connection with said first server in a SIP protocol, and a first terminal for communicating with said first server, wherein said first server comprises:

an interface for receiving a connection request message;

a processing part for making the establishment of connection with said device in said SIP protocol in accordance with received connection request message; and a first transfer control part for transferring data received from said first terminal to said device after the establishment of connection by said processing part.

According to the second solving means of present invention, there is provided a server in a communication system which has said server, a device for making an establishment of connection with said server in a SIP protocol, and a terminal for communicating with said server, said server comprising:

an interface for receiving a connection request message;

a processing part for making the establishment of connection with said device in said SIP protocol in accordance with received connection request message; and a first transfer control part for transferring data received from said first terminal to said device after the establishment of connection by said processing part.

According to the present invention, it is possible to provide a communication system and a server for transferring the data between two parties (first connection terminal and second connection terminal) to be communicated in the NGN with assured communication quality. According to the invention, it is possible to provide a 3PCC service on the NGN with assured communication quality. According to the invention, it is possible to prevent the first connection terminal from being placed in the silent state in establishing the session with the second connection terminal after establishing the session with the first connection terminal in the 3PCC service flow.

Further, according to the invention, it is possible to provide a communication system and a server in which the terminal can reserve the communication band on the NGN with the partner terminal without being aware of the SIP and communicate on the NGN with reserved band through the steady operation on the already existent internet after reserving the communication band. According to the invention, it is possible to mount an interface capable of establishing many sessions on an SOAP-SIP adapter to make it possible to establish hundreds to thousands of sessions.

BRIEF DESCRIPTION OF THE DRAWINGS

FIG. 3A is an explanatory view showing one example of the organization of a session information table 2010 in the SOAP-SIP adapter 2 according to the first embodiment.

FIG. 3B is an explanatory view showing one example of the organization of a call participant information table 2020 in the SOAP-SIP adapter 2 according to the first embodiment.

FIG. 3C is an explanatory view showing one example of the organization of a terminal information table 2030 in the SOAP-SIP adapter 2 according to the first embodiment.

FIG. 3D is an explanatory view showing one example of the organization of a media stream control information table 2040 in the SOAP-SIP adapter 2 according to the first embodiment.

FIG. 6B is an explanatory view showing one example of the organization of a terminal information table 5020 in the SOAP-SIP adapter 6a according to the second embodiment.

FIG. 6C is an explanatory view showing one example of the organization of a media stream control information table 5030 in the SOAP-SIP adapter 6a according to the second embodiment.

FIG. 21C is an explanatory view showing one example of the organization of a media stream control information table 6030 in the SOAP-SIP adapter 6b according to the second embodiment.

DETAILED DESCRIPTION OF THE INVENTION

1. First Embodiment (Network Configuration)

Figure 1:
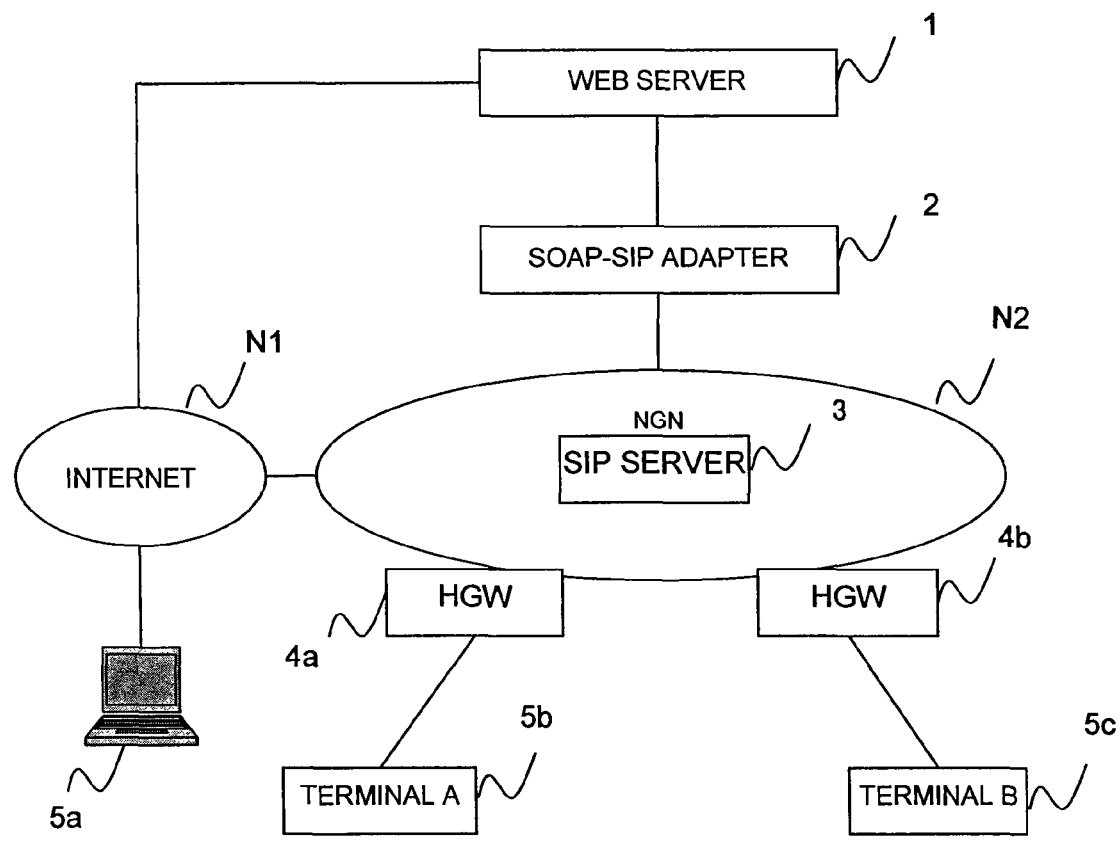
FIG. 1 is an explanatory view showing a configuration example of a communication network according to a first embodiment.

FIG. 1 is an explanatory view showing a configuration example of a communication network according to a first embodiment.

This communication network (system) comprises a Web server 1, an SOAP-SIP adapter 2, a SIP server 3, and an Home Gateway (HGW) 4a, 4b, for example. The SIP server 3 is installed in an NGN N2, for example.

The Web server 1 communicates with the SOAP-SIP adapter 2. Also, the Web server 1 communicates via a network such as internet N1 with a terminal 5a. The SOAP-SIP adapter 2 communicates via the NGN N2 and the HGW 4a with a terminal A5b. The SOAP-SIP adapter 2 and a terminal B5c have also the same configuration.

Figure 2:
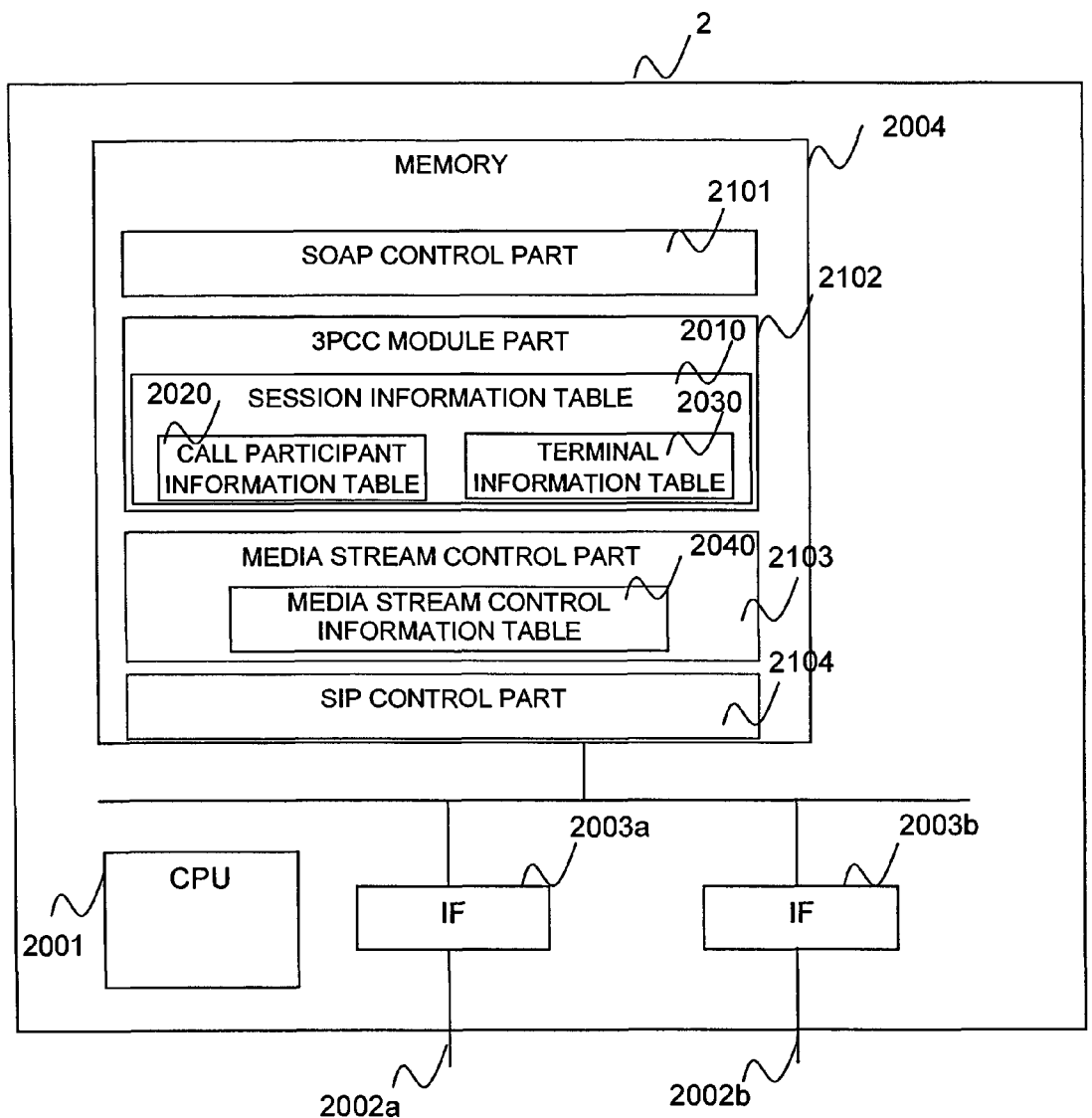
FIG. 2 is an explanatory view showing a configuration example of an SOAP-SIP adapter 2 according to the first embodiment.

FIG. 2 is an explanatory view showing a configuration example of the SOAP-SIP adapter 2 according to the first embodiment.

The SOAP-SIP adapter 2 comprises a processor (hereinafter CPU) 2001, an interface (hereinafter IF) 2003a, 2003b, and a memory 2004, for example. The memory 2004 has an SOAP control part 2101, a 3PCC module part 2102, a media stream control part 2103, and a SIP control part 2104. The 3PCC module part 2102 has a session information table 2010, and the media stream control part 2103 has a media stream control information table 2040. The session information table 2010 has a call participant information table 2020 and a terminal information table 2030.

The CPU 2001 performs each processing in the SOAP-SIP adapter 2. The SOAP control part 2101, the 3PCC module part 2102, the media stream control part 2103 and the SIP control part 2104 on the memory 2004 are performed by the CPU 2001. The IF 2003 is interface for making the communication via a line 2002 with the Web server 1 and the NGN N2.

FIG. 3A is an explanatory view showing one example of the organization of the session information table 2010 in the SOAP-SIP adapter 2 according to the first embodiment.

The session information table 2010 stores, associated with a session ID 2011, a session state 2012, a call participant state 2020, and the terminal information 2030, for example.

The session ID 2011 is a session identifier corresponding to a connection request from the Web server 1. The session ID 2011 identifies the communication between the terminal A5b and the terminal B5c. The session state 2012 indicates the state of session designated by the session ID 2011. The session state 2012 stores an "Initial (initial state)", a "Connected (connected state)", or a "Terminated (terminated state)", for example. The call participant state 2020 corresponds to the call participant information table 2020. The details of the call participant information table 2020 will be described below. The terminal information 2030 corresponds to the terminal information table 2030. The terminal information 2030 is stored for each terminal. In an illustrated example, the terminal information (for Client A) 2030_A corresponding to the terminal A5b and the terminal information (for Client B) 2030_B corresponding to the terminal B5c are stored. The details of the terminal information table 2030 will be described below.

FIG. 3B is an explanatory view showing one example of the organization of the call participant information table 2020 in the SOAP-SIP adapter 2 according to the first embodiment.

The call participant information table 2020 stores, for each terminal, a URI 2021, a call state 2022 and a start time (clock) 2023, for example.

The URI 2021 indicates a SIP-URI corresponding to each user. The call state 2022 indicates the state of session of the SIP between the SOAP-SIP adapter 2 and each terminal 5b, 5c. The call state 2022 stores a "Call Participant Initial (Initial state)", a "Call Participant Connected (connected state)" or a "Call Participant Terminated (terminated state)", for example. The start time 2023 indicates the time when the SOAP-SIP adapter 2 establishes the session of the SIP for each terminal 5b, 5c.

FIG. 3C is an explanatory view showing one example of the organization of the terminal information table 2030 in the SOAP-SIP adapter 2 according to the first embodiment.

The terminal information table 2030 stores the parameters for use in the SIP, for example. The terminal information table 2030 stores a handle value 2031, a session ID 2032, a terminal state 2033, a Role 2034, the send Session Description Protocol (SDP) information 2035, the recv SDP information 2036, a From URI 2037, and a To URI 2038, for example.

The handle value 2031 is the information for identifying the session of the SIP between the SOAP-SIP adapter 2 and the terminal 5b and the session of the SIP between the SOAP-SIP adapter 2 and the terminal B5c. The session ID 2032 corresponds to the session ID 2011 of the session information table 2010. The terminal state 2033 indicates the state till establishing the session between the SOAP-SIP adapter 2 and each terminal 5b, 5c. The terminal state 2033 accepts an "Initial (initial state)", a "Connect Wait (state waiting for a 'response')", a "Call Complete (state accepting the 'response' and establishing the session with the UA, a "Close Wait (state waiting for a 'disconnect complete notice')", and a "Closed (terminated state)", for example. The "Initial" and the "Connect Wait" correspond to the "Call Participant Initial" of the call state 2022 stored in the call participant information table 2020. Also, the "Call Complete" and the "Close Wait" correspond to the "Call Participant Connected" of the call state 2022 stored in the call participant information table 2020. The "Close Wait" corresponds to the "Call Participant Terminated" of the call state 2022.

The Role 2034 is the information indicating the call outgoing side or call incoming side. The send SDP information 2035 includes the IP address and the port number of the SOAP-SIP adapter 2, for example. The recv SDP information 2036 includes the IP address and the port number of the terminal A5b or terminal B5c, for example. The From URI 2037 indicates the sender URI of a SIP message sent by the SOAP-SIP adapter 2. The From URI 2037 is the SIP-URI of the SOAP-SIP adapter 2, for example. The To URI 2038 indicates the destination URI of SIP message sent by the SOAP-SIP adapter 2. The To URI 2038 is the SIP-URI of the terminal A5b or terminal B5c, for example.

FIG. 3D is an explanatory view showing one example of the organization of the media stream control information table 2040 in the SOAP-SIP adapter 2 according to the first embodiment.

The media stream control information table 2040 stores, associated with a session ID 2041, a media stream sending/receiving IP address 2042, a media stream sending/receiving port number 2043, a partner IP address (1) 2044, a partner port number (1) 2045, a partner IP address (2) 2046, and a partner port number (2) 2047, for example.

The session ID 2041 corresponds to the session ID 2011 of the session information table 2010. The media stream sending/receiving IP address 2042 and the media stream sending/receiving port number 2043 are the IP address and the port number of the IF 2003 for use when the SOAP-SIP adapter 2 transfers the media stream. The pairs of the partner IP address (1) 2044 and the partner port number (1) 2045 and the partner IP address (2) 2046 and the partner port number (2) 2047 designate the destination of transferring the media stream. For example, in the case where the sender of the media stream corresponds to the partner IP address (1) 2044 and the partner port number (1) 2045, the media stream is transferred to the corresponding destination with the partner IP address (2) 2046 and the partner port number (2) 2047. In the case where the sender of the media stream corresponds to the partner IP address (2) 2046 and the partner port number (2) 2047, the media stream is transferred to the corresponding destination with the partner IP address (2) 2044 and partner port number (1) 2045 in the same manner. In an illustrated example, the partner IP address (1) 2044 and the partner port number (1) 2045 designate the IP address and the port number of the terminal A5b, and the partner IP address (2) 2046 and the partner port number (2) 2047 designate the IP address and the port number of the terminal B5c.

Figure 24:
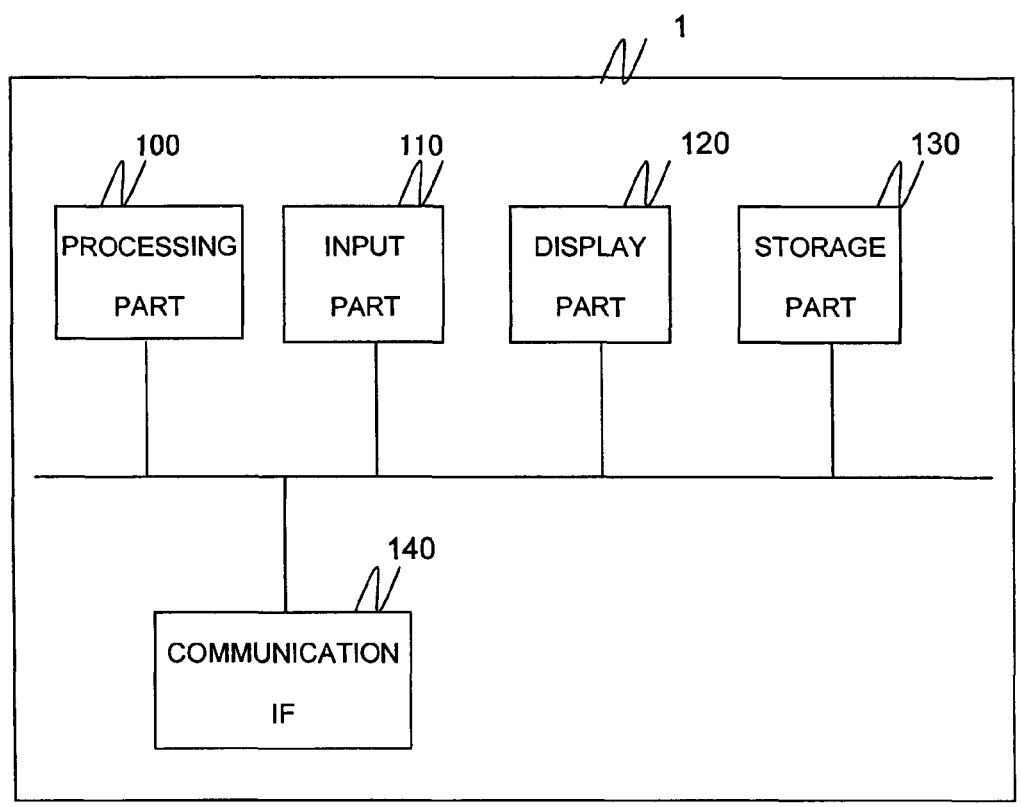
FIG. 24 is a configuration diagram of a web server 1.

FIG. 24 is a configuration diagram of the web server 1.

The web server 1 comprises a processing part 100, an input part 110, a display part 120, a storage part 130, and a communication interface 140, for example. The input part 110 receives the input of a Session ID or the input of a user identifier, for example. The display part 120 displays the user identifier and the SIP-URI. The storage part 130 stores the received Session ID, for example. The communication interface 140 is the interface for communicating with the SOAP-SIP adapter 2, for example. The processing part 100 performs various kinds of processing in the web server 1.

(Operation)

Figure 12:
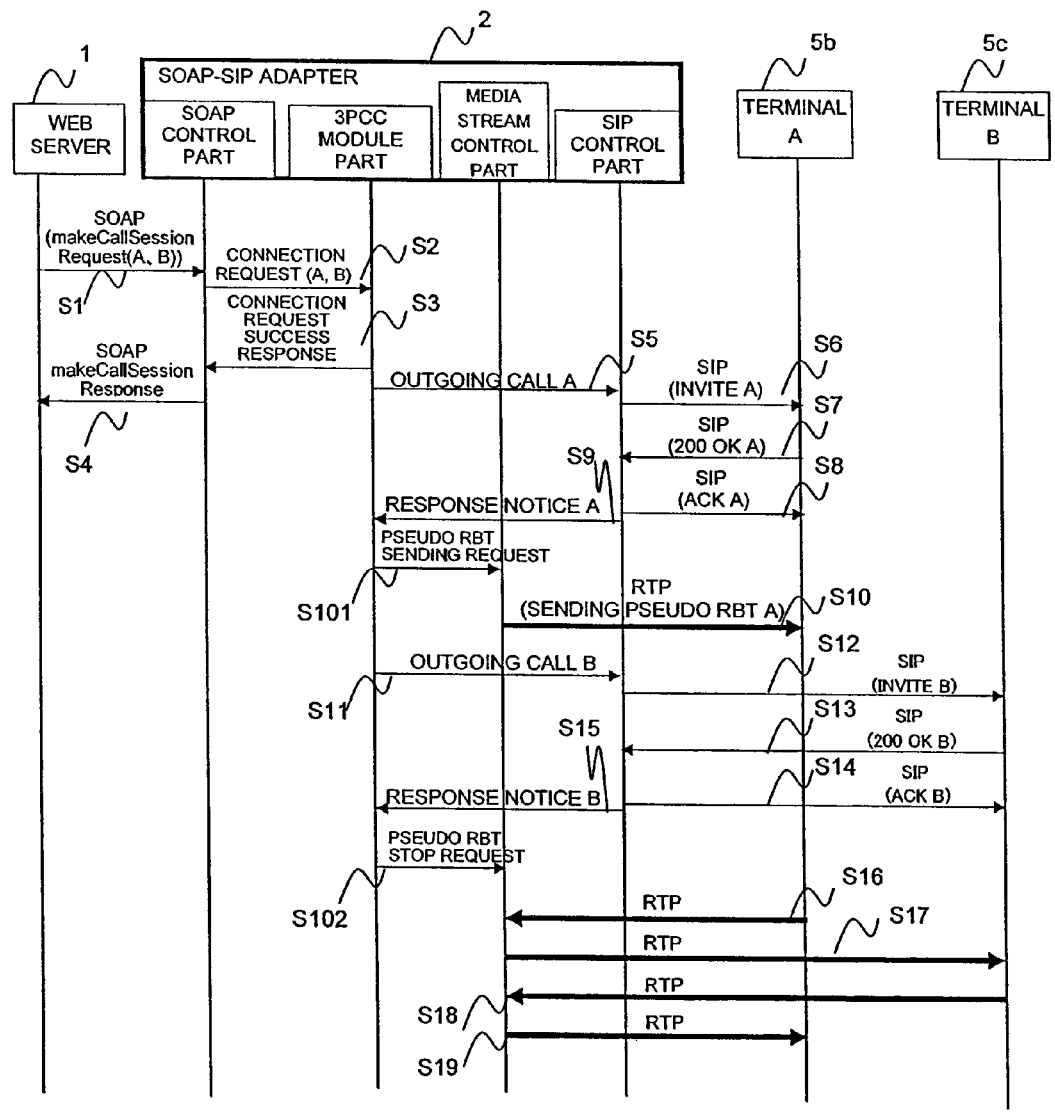
FIG. 12 is a sequence chart (1) for explaining a 3PCC service procedure according to the first embodiment.

FIG. 12 is a sequence chart for explaining a 3PCC service procedure according to the first embodiment.

Figure 7:
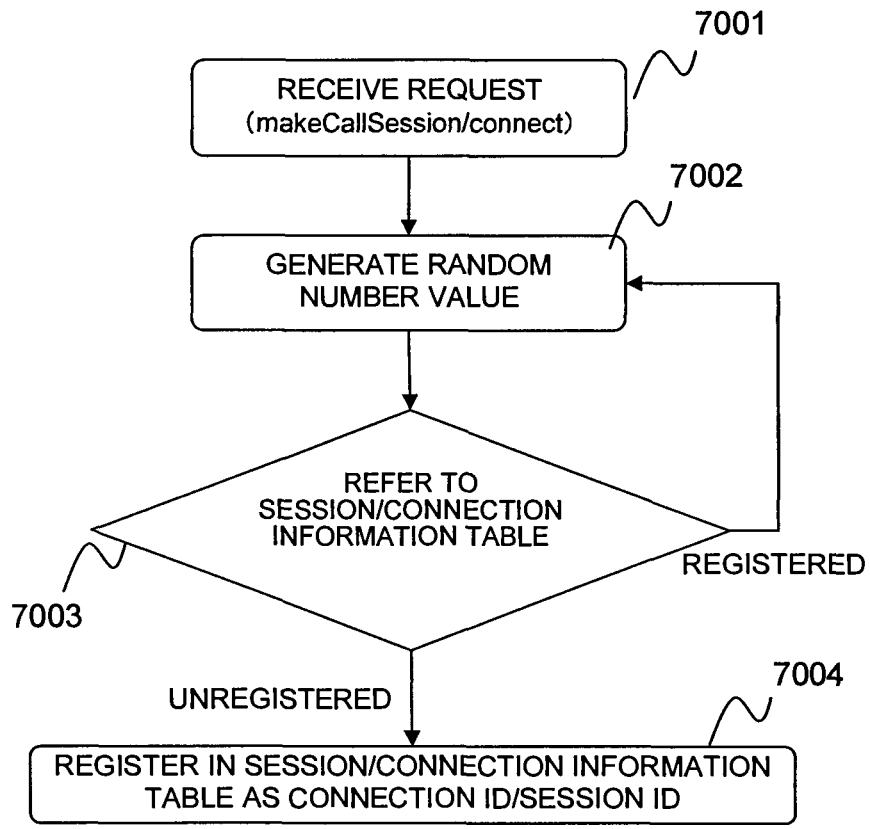
FIG. 7 is a flowchart for explaining the generation of a session ID/connection ID in the SOAP-SIP adapter.
Figure 8:
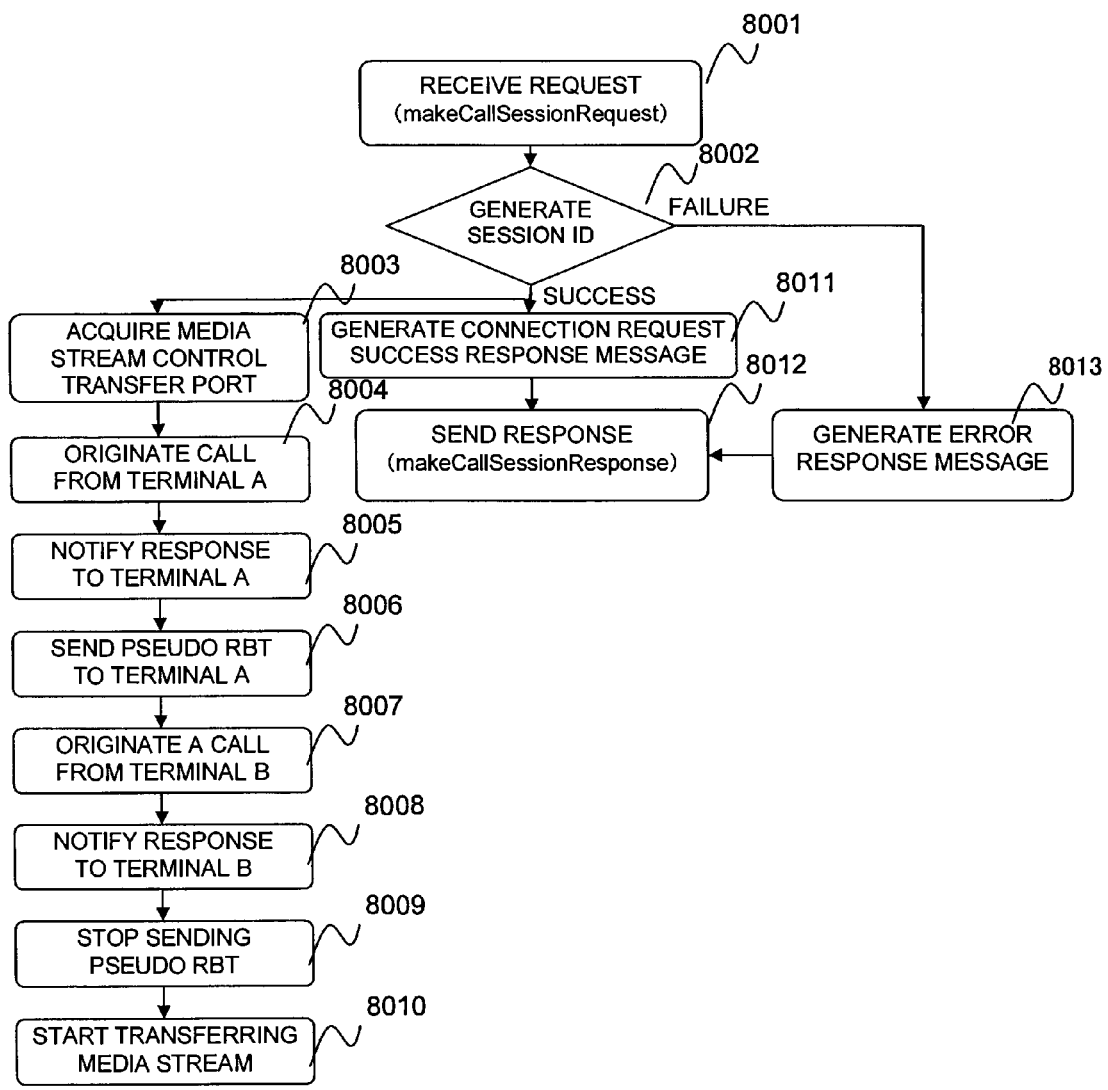
FIG. 8 is a flowchart for explaining the operation in receiving a call start request in the SOAP-SIP adapter 2 according to the first embodiment.

FIG. 7 is a flowchart for explaining the generation of a session ID/connection ID in the SOAP-SIP adapter. The connection ID is used in the second embodiment. FIG. 8 is a flowchart for explaining the operation in receiving a call start request in the SOAP-SIP adapter 2 according to the first embodiment.

According to this embodiment, it is possible to provide the 3PCC service on the NGN with the assured communication quality.

The flow up to the 3PCC service is the following (a) to (c). (a) Establishment of the session between the SOAP-SIP adapter 2 and the first connection terminal A5b. (b) Establishment of the session between the SOAP-SIP adapter 2 and the second connection terminal B5c. (c) Telephone communication between the first connection terminal A5b and the second connection terminal B5c. However, there is a problem that the first connection terminal A5b is placed in a silent state at the stage where (a) is completed and (b) is started. Thus, a Ringing Back Tone, (RBT, connection maintaining message) is artificially sent from the SOAP-SIP adapter 2 to the first connection terminal A5b to resolve this problem.

Also, in the NGN, there is a necessary condition that the IP addresses for establishing the signaling channel and the data channel are the same, resulting in a problem that it is impossible to vicariously execute the establishment of data channel between two parties (the first connection terminal A5b and the second connection terminal B5c) to be communicated as in the conventional 3PCC service flow. Thus, in this embodiment, the data from the first connection terminal A5b is received by the SOAP-SIP adapter 2 and transferred to the second connection terminal B5c. The data from the second connection terminal B5c is received by the SOAP-SIP adapter 2 and transferred to the first connection terminal A5b. Also, the SOAP-SIP adapter 2 creates the media stream control information table 2040 for implementing the above transfer.

The procedure of this embodiment will be described below in accordance with the sequence charts and the flowcharts.

First of all, the user of the third party logs into the Web server 1 by operating the terminal 5a. The Web server 1 inputs the user identifiers of the users to communicate (e.g., user names of two parties corresponding to the terminal A5b and the terminal B5c) from the terminal 5a. For example, the Web server 1 may select the users of two parties to communicate through the operation of the user in accordance with the screen displayed for the terminal 5a that logs in.

The Web server 1 sends an SOAP make Call Session Request (connection request) to the SOAP-SIP adapter 2 (S1). The SOAP make Call Session Request includes the SIP-URI corresponding to each of the user of two parties to be connected. For example, the Web server 1 acquires the SIP-URI corresponding to the input user identifier, because the user identifier and the SIP-URI of the user are associated and prestored. The Web sever 1 generates the SOAP make Call Session Request including the acquired SIP-URI, and sends it to the SOAP-SIP adapter 2.

The SOAP-SIP adapter 2 starts the connection to each terminal 5b, 5c corresponding to the SIP-URI included in the received SOAP make Call Session Request, and sends an SOAP make Call Session Response including the session ID generated in the SOAP-SIP adapter 2 (S2 to S15). The detailed operation of the steps S2 to S15 in the SOAP-SIP adapter 2 will be described below.

The SOAP control part 2101 of the SOAP-SIP adapter 2 receives the SOAP make Call Session Request, and sends a connection request to the 3PCC module part 2102 (S2). This connection request can be generated in accordance with an appropriate protocol for use in the SOAP-SIP adapter 2, based on the received SOAP make Call Session Request, for example, and includes the SIP-URI within the SOAP make Call Session Request.

The 3PCC module part 2102 receives the connection request (7001, 8001), and generates a session ID (8002). Referring to FIG. 7, the generation of the session ID will be described below.

The 3PCC module part 2102 receives the connection request and generates the random number value (7002). The 3PCC module part 2102 judges whether or not the generated random number value is already registered in the session ID 2011 of the session information table 2010 (7003). If the generated random number value is already registered (i.e., already used), the 3PCC module part 2102 returns to step 7002 to repeat the subsequent processing. On the other hand, if the generated random number value is not registered, the 3PCC module part 2102 stores the generated session ID in the session information table 2010 (7004). Further, the 3PCC module part 2102 sets the session state 2012 of the session information table 2010 to "Initial (initial state)".

Also, the 3PCC module part 2102 stores the SIP-URI included in the received connection request in the call participant information table 2020. In an example of the call participant information table 2020 as shown in FIG. 3B, the SIP-URI (see 2020_A) of the terminal A5b and the SIP-URI (see 2020_B) of the terminal B5c are stored. The 3PCC module part 2102 sets the call state 2022 corresponding to each terminal 5b, 5c of the call participant information table 2020 to "Call Participant Initial (initial state)".

Moreover, the 3PCC module part 2102 stores the terminal information of the terminal A5b and the terminal B5c. More specifically, the 3PCC module part 2102 stores the generated session ID in the terminal information table 2030, associated with each terminal 5b, 5c. Also, the 3PCC module part 2102 stores each SIP-URI included in the received connection request in the To URI 2038 corresponding to each terminal 5b, 5c of the terminal information table 2030. The 3PCC module part 2102 sets the terminal state 2032 corresponding to each terminal 5b, 5c of the terminal information table 2030 to "Initial (initial state)". The 3PCC module part 2102 sets the information indicating the call outgoing side or call incoming side to the Role 2033 corresponding to each terminal 5b, 5c of the terminal information table 2030. It can be appropriately decided which of the terminals 5b and 5c is the call outgoing side. Also, the 3PCC module part 2102 stores the IP address and the port number of the SOAP-SIP adapter 2 in the send SDP information 2035 of the terminal information table 2030. Also, the 3PCC module part 2102 stores the SIP-URI of the SOAP-SIP adapter 2 in the From URI 2037 corresponding to each terminal 5b, 5c of the terminal information table 2030. The SIP-URI, the IP address and the port number of the SOAP-SIP adapter 2 are prestored in the appropriate storage part.

The 3PCC module part 2102 generates a connection request success response, and sends it to the SOAP control part 2101 (S3, 8011). The connection request success response includes the generated session ID. The SOAP control part 2101 receives the connection request success response, and sends an SOAP make Call Session Response (connection request success response) to the Web server 1 (S4, 8012). The SOAP make Call Session Response includes the generated session ID, and is generated in accordance with the SOAP, based on the received connection request success response. The Web server 1 receives the SOAP make Call Session Response, and stores the session ID included in the received SOAP make Call Session Response in the appropriate storage part.

If the generation of the session ID fails at step 8002, the 3PCC module part 2102 generates a connection request failure response (error response message) (8013), and sends it to the SOAP control part 2101. The SOAP control part 2101 receives the connection request failure response, and sends an SOAP make Call Session Response indicating the connection request failure to the Web server 1 (8012).

Next, the session between the SOAP-SIP adapter 2 and the terminal A5b is established.

More specifically, the 3PCC module part 2102 acquires a media stream control/transfer port (8003). The 3PCC module part 2102 sends a call outgoing request (A) for the terminal A5b to the SIP control part 2104 (S5, 8004). For example, the 3PCC module part 2102 sends the call outgoing request including the send SDP information 2035, the From URI 2037 and the To URI 2038 corresponding to the terminal A5*b* stored in the terminal information table 2030 to the SIP control part 2104. Also, the 3PCC module part 2102 stores the current time as one example in the start time 2023 corresponding to the terminal A5*b* of the call participant information table 2020. In an example of the call participant information table 2020 as shown in FIG. 3B, "2008.10.22 10:30.30" is stored. The start time 2023 is not limited to the current time, but may be the appropriate time indicating the start of session with the terminal A5*b*.

The SIP control part 2104 sends an INVITE message (A) to the terminal A5*b* in accordance with the To URI included in the call outgoing request (A) (S6). The INVITE message (A) includes at least the send SDP information, the From URI, and the To URI included in the received call outgoing request, for example. Also, the SIP control part 2104 generates a handle value identifying the session with the terminal A5*b*.

The terminal A5*b* receives the INVITE message (A), and stores the IP address and the port number of the SOAP-SIP adapter 2 included in the send SDP information of the received INVITE message (A) in the appropriate storage part. The stored IP address and port number are used in sending the media stream, for example. Also, the terminal A5*b* generates the recv SDP information including its own IP address and port number and sends a 200 OK (A) of the SIP including the generated SDP information to the SOAP-SIP adapter 2 (S7). The SIP control part 2104 of the SOAP-SIP adapter 2 receives the 200 OK (A) and sends an ACK (A) of the SIP to the terminal A5*b* (S8).

The SIP control part 2104 sends a response notice (A) to the 3PCC module part 2102 (S9, 8005). The response notice (A) includes the handle value generated at step S6 and the recv SDP information of the terminal A5*b* included in the 200 OK received at step S7, for example. The 3PCC module part 2102 stores, associated with the terminal A5*b*, the handle value and the recv SDP information included in the received response notice (A) in the terminal information table 2030. The handle value may be stored at an appropriate timing from step S6 to step S8. The 3PCC module part 2102 updates the terminal state 2033 corresponding to the terminal A5*b* of the terminal information table 2030 to "Call Complete (session established state)". Also, the 3PCC module part 2102 updates the call state 2022 corresponding to the terminal A5*b* of the call participant information table 2020 to "Call Participant Connected (connected state)". The terminal state 2033 may be appropriately updated upon sending or receiving the SIP message (e.g., 200 OK and so on), for example.

Also, the 3PCC module part 2102 sends the generated session ID, the IP address and port number of the SOAP-SIP adapter 2, and the IP address and port number of the terminal A5*b* included in the received recv SDP information to the media stream control part 2103. The media stream control part 2103 stores the received information in the media stream control information table 2040. For example, the media stream control part 2103 stores the received IP address and port number of the SOAP-SIP adapter 2 at the media stream sending/receiving IP address 2042 and the media stream sending/receiving port number 2043, and stores the received IP address and port number of the terminal A5*b* at the partner IP address (1) 2044 and the partner port number (1) 2045. Also, the media stream control part 2103 stores the received session ID.

The 3PCC module part 2102 sends a pseudo RBT sending request to the media stream control part 2103 (S101). The media stream control part 2103 receives the pseudo RBT sending request, and sends the pseudo RBT to the terminal A5*b* in accordance with a Real-time Transport Protocol (RTP), for example (S10, 8006). The media stream control part 2103 may use an announcement of calling the partner or appropriate music, for example, as the pseudo RBT. In this embodiment, the terminal A5*b* is prevented from being in silent state at the stage where the establishment of session with the terminal A5*b* is completed and the establishment of session with the terminal B5*c* is started. This pseudo RBT can continue to be sent until a stop request is made as will be described later.

Next, the session between the SOAP-SIP adapter 2 and the terminal B5*c* is established.

The 3PCC module part 2102 sends a call outgoing request (B) for the terminal B5*c* to the SIP control part 2104 (S11, 8007). For example, the 3PCC module part 2102 sends the call outgoing request including the send SDP information 2035, the From URI 2037 and the To URI 2038 corresponding to the terminal B5*c* stored in the terminal information table 2030 to the SIP control part 2104. Also, the 3PCC module part 2102 stores the current time in the start time 2023 corresponding to the terminal B5*c* of the call participant information table 2020. In an example of the call participant information table 2020 as shown in FIG. 3B, "2008.10.22 10:30.45" is stored.

The SIP control part 2104 sends an INVITE message (B) to the terminal B5*c* in accordance with the To URI included in the call outgoing request (A) (S12). The INVITE message (B) includes at least the send SDP information, the From URI, and the To URI included in the received call outgoing request, for example. Also, the SIP control part 2104 generates a handle value identifying the session with the terminal B5*c*.

The terminal B5*c* receives the INVITE message (B), and stores the IP address and port number of the SOAP-SIP adapter 2 included in the send SDP information of the received INVITE message (B) in the appropriate storage part. Also, the terminal B5*c* generates the recv SDP information including its own IP address and port number and sends a 200 OK (B) including the generated recv SDP information to the SOAP-SIP adapter 2 (S13). The SIP control part 2104 of the SOAP-SIP adapter 2 receives the 200 OK (B) and sends an ACK (B) to the terminal B5*c* (S14).

The SIP control part 2104 sends a response notice (B) to the 3PCC module part 2102 (S15, 8008). The response notice (B) includes the handle value generated at step S12 and the recv SDP information of the terminal B5*c* included in the 200 OK received at step S13, for example. The 3PCC module part 2102 stores the handle value and the recv SDP information included in the received response notice (B) in the terminal information table 2030, associated with the terminal B5*c*. The handle value may be stored at an appropriate timing from step S12 to step S14. The 3PCC module part 2102 updates the terminal state 2033 corresponding to the terminal B5*c* of the terminal information table 2030 to "Call Complete (session established state)". Also, the 3PCC module part 2102 updates the call state 2022 corresponding to the terminal B5*c* of the call participant information table 2020 to "Call Participant Connected (connected state)". Also, the 3PCC module part 2102 updates the session state of the session information table 2010 to "Connected (connected state)".

The 3PCC module part 2102 sends the session ID, and the IP address and port number of the terminal B5*c* included in the received recv SDP information to the media stream control part 2103. The media stream control part 2103 stores, associated with the received session ID, the IP address and port number of the terminal B5*c* in the partner IP address (2)

2046 and the partner port number (2) 2047 of the media stream control information table 2040.

The 3PCC module part 2102 sends a pseudo RBT stop request to the media stream control part 2103 (S102, 8009). The media stream control part 2103 stops sending the pseudo RBT in accordance with the pseudo RBT stop request.

The SOAP-SIP adapter 2 starts to transfer the media stream between the terminal A5b and the terminal B5c (8010).

For example, the terminal A5b sends the media stream to the SOAP-SIP adapter 2 in accordance with the RTP (S16). At this time, the terminal A5b sets the IP address and port number of the SOAP-SIP adapter 2 stored at step S6 to the destination, and sets its own IP address and port number to the sender.

The media stream control part 2103 of the SOAP-SIP adapter 2 transfers the received media stream to the terminal B5c by referring to the media stream control information table 2040 (S17). For example, the media stream control part 2103 acquires the corresponding partner IP address and port number by referring to the media stream control information table 2040 based on the sender IP address and port number of the received media stream. In an example of the media stream control information table 2040 as shown in FIG. 3D, the sender IP address and port number of the received media stream are the IP address (10.0.2.1) and port number (20000) of the terminal A5b, and the corresponding partner IP address (2) 2046 (10.0.2.2) and port number (2) 2047 (30000) are acquired. The media stream control part 2103 transfers the received media stream to the terminal B5c in accordance with the acquired IP address and port number.

Similarly, the terminal B5c sends the media stream to the SOAP-SIP adapter 2 in accordance with the RTP (S18). In the same manner as the case of the terminal A5b, the terminal B5c sets the IP address and port number of the SOAP-SIP adapter 2 stored at step S12 to the destination, and sets its own IP address and port number to the sender.

The media stream control part 2103 of the SOAP-SIP adapter 2 transfers the received media stream to the terminal A5b by referring to the media stream control information table 2040 (S19). In an example of the media stream control information table 2040 as shown in FIG. 3D, the sender IP address and port number of the received media stream are the IP address (10.0.2.2) and port number (30000) of the terminal B5c, and the corresponding partner IP address (1) 2044 (10.0.2.1) and port number (1) 2045 (20000) are acquired. The media stream control part 2103 transfers the received data stream to the terminal A5b in accordance with the acquired IP address and port number.

As described above, the IP address establishing the signaling channel and the IP address establishing the data channel become the same, whereby the data from the terminal A5b is received by the SOAP-SIP adapter 2 and transferred to the terminal B5c, and the data from the terminal B5c is received by the SOAP-SIP adapter 2 and transferred to the terminal A5b, so that the 3PCC service on the NGN with the assured communication quality is enabled.

Figure 9:
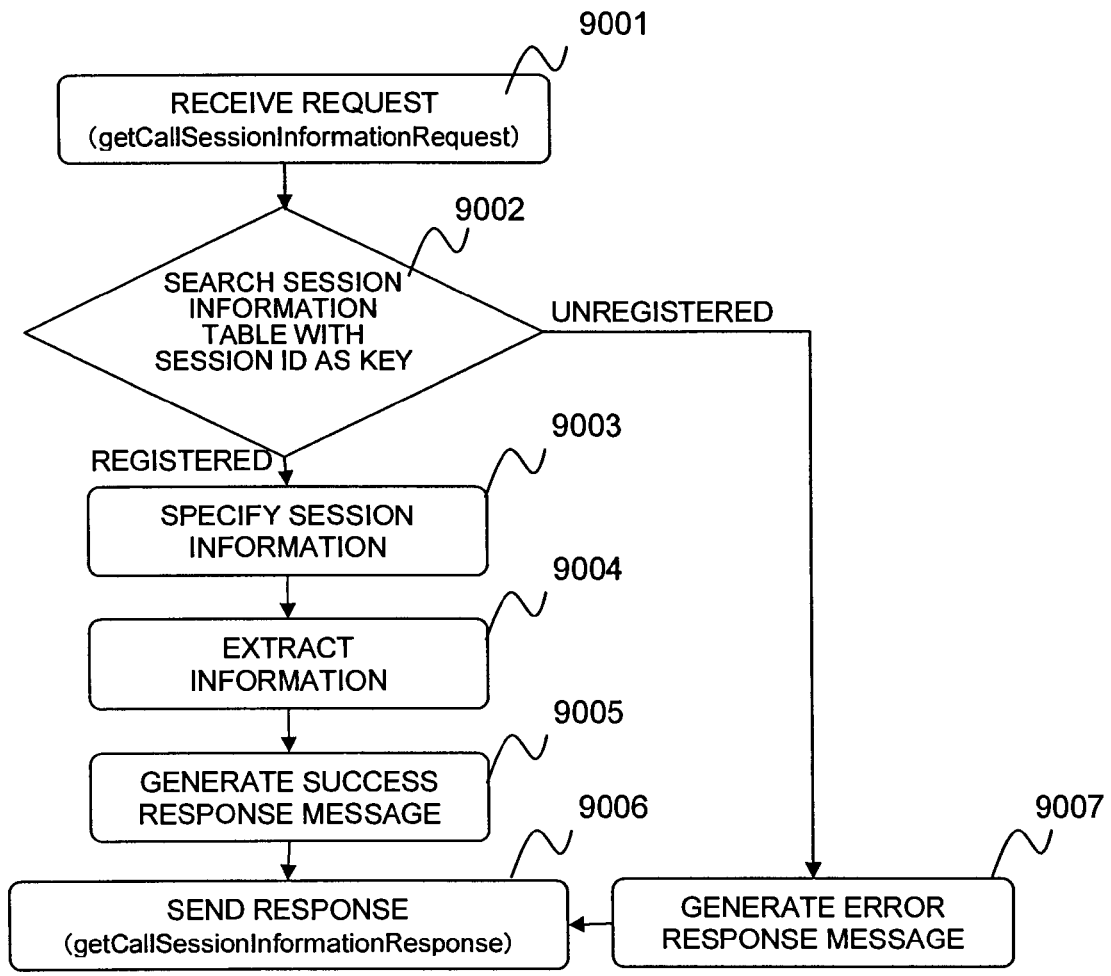
FIG. 9 is a flowchart for explaining the operation in receiving a call information (session information) request in the SOAP-SIP adapter 2 according to the first embodiment.
Figure 13:
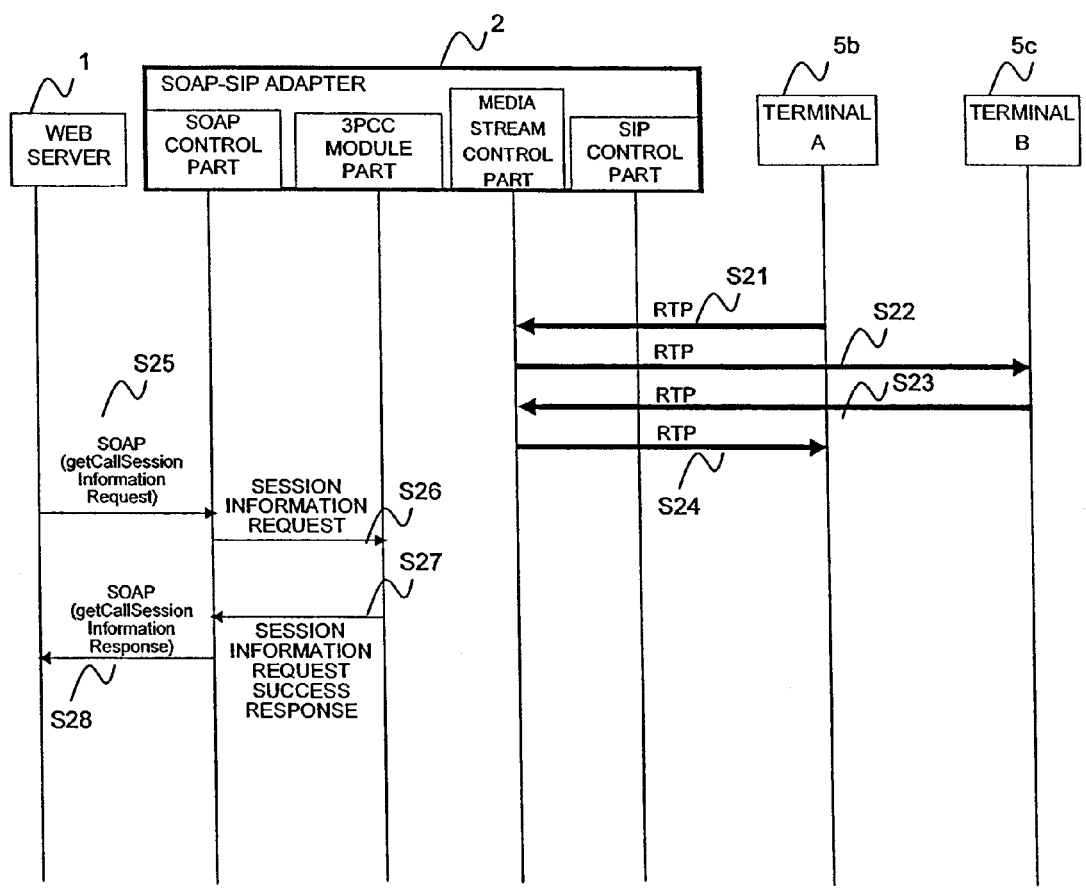
FIG. 13 is a sequence chart (2) for explaining the 3PCC service procedure according to the first embodiment.

FIG. 13 is a sequence chart (2) for explaining the 3PCC service procedure according to the first embodiment. FIG. 9 is a flowchart for explaining the operation in receiving a call information (session information) request in the SOAP-SIP adapter 2 according to the first embodiment.

Referring to FIGS. 13 and 9, the operation that the Web server 1 acquires the call information will be described below. Herein, the Web server 1 can acquire the information corresponding to the designated session ID. The processings of steps S21 to S24 in FIG. 13 correspond to the processings of steps S16 to S19 as described above.

The Web server 1 sends an SOAP get Call Session Information Request (session information request, call information request) to the SOAP-SIP adapter 2 (S25). The SOAP get Call Session Information Request includes the session ID of the call information to be acquired. More specifically, the Web sever 1 generates the SOAP get Call Session Information Request including the session ID stored at step S4 as described above, and sends it to the SOAP-SIP adapter 2. The Web server 1 may select the session ID of the call information to be acquired from the session ID stored at step S4 as described above, based on the user operation from the terminal 5a.

The SOAP-SIP adapter 2 searches the session information table 2010 held in the SOAP-SIP adapter 2 with the session ID included in the SOAP get Call Session Information Request as the key, and sends the SOAP get Call Session Information Response including the table information of the matched session ID 2011 (S26 to S28). The detailed operation of steps S26 to S28 in the SOAP-SIP adapter 2 will be described below.

First of all, the SOAP control part 2101 of the SOAP-SIP adapter 2 receives the SOAP get Call Session Information Request, and sends a session information request to the 3PCC module part 2102 (S26). This session information request includes the session ID in the SOAP get Call Session Information Request.

The 3PCC module part 2102 receives the session information request (9001), and searches the session information table 2010 for the session ID 2011 based on the session ID included in the received session information request (9002). If the session ID included in the received session information request is already registered in the session information table 2010, the session information corresponding to the pertinent session ID 2011 is specified (9003). The 3PCC module part 2102 acquires the URI 2021 and the call state 2022 corresponding to each terminal 5b, 5c, for example, by referring to the call participant information table (call participant state) 2020 corresponding to the pertinent session ID 2011 (9004). Further, the 3PCC module part 2102 acquires the recv SDP information 2036 of each terminal from the terminal information (for Client A) 2030_A and the terminal information (for Client B) 2030_B corresponding to the pertinent session ID 2011, for example.

The 3PCC module part 2102 generates a session information request success response including the session ID 2011, the acquired URI 2021, the call state 2022 and the recv SDP information 2036 (9005), and sends the generated session information request success response to the SOAP control part 2101 (S27). The SOAP control part 2101 receives the session information request success response, and sends an SOAP get Call Session Information Response (session information request success response) to the Web server 1 (S28, 9006). The SOAP get Call Session Information Response includes the session ID, the URI, the call state and the recv SDP information in the received session information request success response and is generates in accordance with the SOAP.

If the session ID included in the received session information request is not registered at step 9002, the 3PCC module part 2102 generates a session information request failure response (error response message) (9007), and sends the generated session information request failure response to the SOAP control part 2101. The SOAP control part 2101 receives the session information request failure response, and sends the SOAP get Call Session Information Response indicating the session information request failure to the Web server 1 (9006).

The Web server 1 receives the SOAP get Call Session Information Response, and can confirm the session state as to whether or not the requested communication comes into existence by referring to the call state included in the received SOAP get Call Session Information Response, for example. For example, if the call is terminated from the terminal, the call state becomes "Call Participant Terminated (terminated state)", whereby the Web server 1 can judge that the call is terminated from the terminal A5b or terminal B5c. Also, for example, if the call state is not normal, the Web server 1 may stop the communication using an SOAP end Call Session Request as will be described later.

Figure 10:
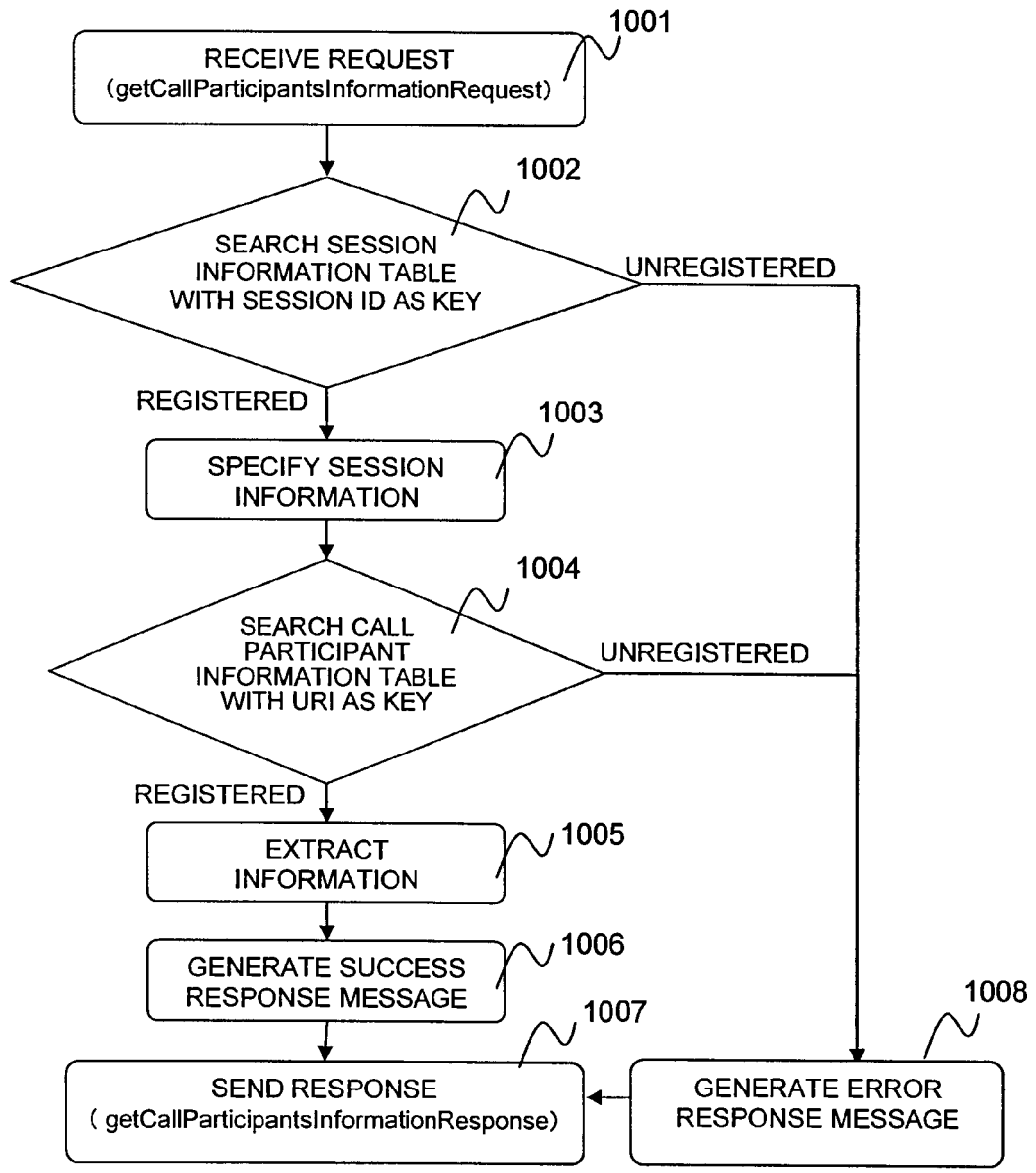
FIG. 10 is a flowchart for explaining the operation in receiving a call participant information request in the SOAP-SIP adapter 2 according to the first embodiment.
Figure 14:
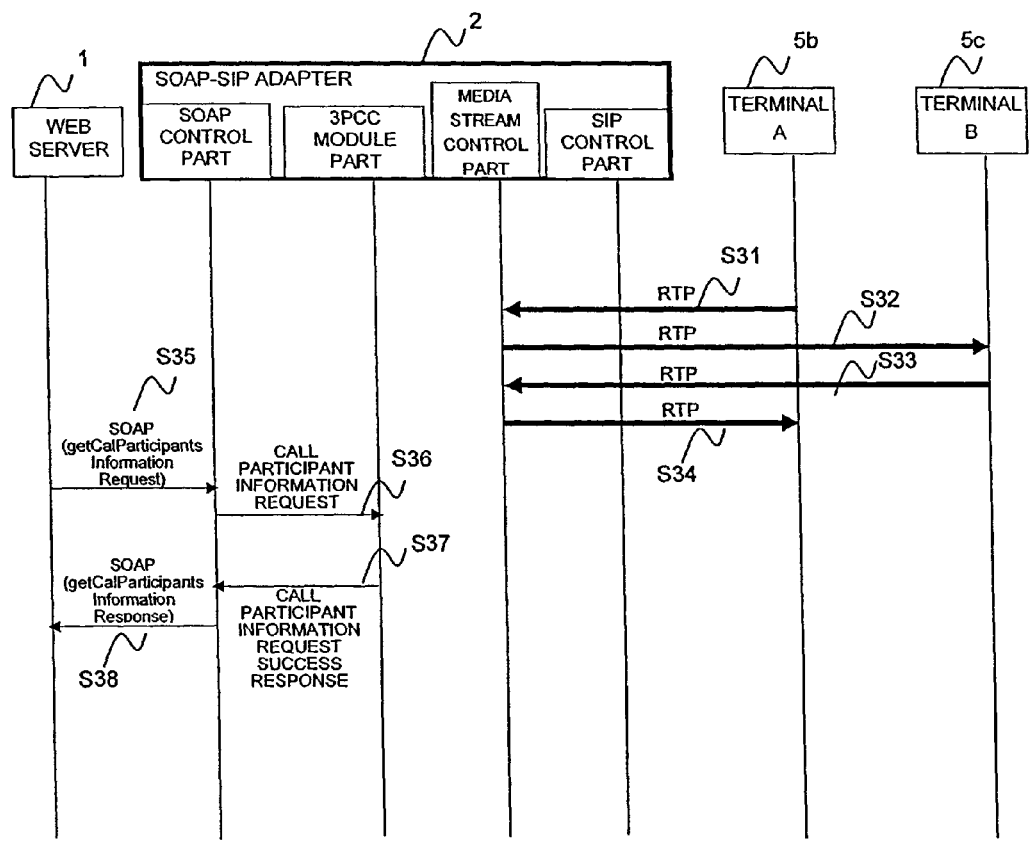
FIG. 14 is a sequence chart (3) for explaining the 3PCC service procedure according to the first embodiment.

FIG. 14 is a sequence chart (3) for explaining the 3PCC service procedure according to the first embodiment. FIG. 10 is a flowchart for explaining the operation in receiving a call participant information request in the SOAP-SIP adapter 2 according to the first embodiment.

Referring to FIGS. 14 and 10, the operation that the Web server 1 acquires the call participant information will be described below. Herein, the Web server 1 can acquire the user information corresponding to the designated SIP-URI. The processings of steps S31 to S34 in FIG. 14 correspond to the processings of steps S16 to S19 as described above.

The Web server 1 sends an SOAP get Call Participants Information Request (call participant information request) to the SOAP-SIP adapter 2 (S35). The SOAP get Call Participants Information Request includes the session ID and URI of the call participant information to be acquired. More specifically, the Web sever 1 generates the SOAP get Call Session Information Request including the session ID stored at step S4 as described above and the SIP-URI of the desired call participant, and sends it to the SOAP-SIP adapter 2. As one example, the Web server 1 may select the session ID and the user identifier (e.g., user name corresponding to the terminal A5b, terminal B5c) of the call information to be acquired based on the user operation from the terminal 5a. The Web server 1 can acquire the SIP-URI corresponding to the input user identifier, because the user identifier and the SIP-URI of the user are associated and prestored as above described.

The SOAP-SIP adapter 2 searches the session information table 2010 held in the SOAP-SIP adapter 2 with the session ID included in the SOAP get Call Participants Information Request as the key, and specifies the table information of the matched session ID 2011. Further, the SOAP-SIP adapter 2 searches the call participant information table 2020 with the SIP-URI included in the SOAP get Call Participants Information Request as the key, and sends the SOAP get Call Participants Information Response including the table information corresponding to the matched SIP-URI 2021 (S36 to S38). The operation of steps S36 to S38 in the SOAP-SIP adapter 2 will be described below.

The SOAP control part 2101 of the SOAP-SIP adapter 2 receives the SOAP get Call Participants Information Request, and sends a call participant information request to the 3PCC module part 2102 (S36). This call participant information request includes the session ID and the SIP-URI in the SOAP get Call Participants Information Request. The 3PCC module part 2102 receives the call participant information request (1001), and searches the session information table 2010 for the session ID 2011, based on the session ID included in the received call participant information request (1002). If the session ID included in the received call participant information request is already registered in the session information table 2010, the session information is specified by the pertinent session ID 2011 (1003). The 3PCC module part 2102 searches the call participant information table (call participant state) 2020 corresponding to the pertinent session ID 2011 for the URI 2021, based on the SIP-URI included in the received call participant information request (1004). If the SIP-URI included in the received call participant information request is already registered, the 3PCC module part 2102 acquires the call state 2022 corresponding to the pertinent URI 2021 (1005). Also, the 3PCC module part 2102 acquires the corresponding recv SDP information 2036 by referring to the To URI 2038 of the terminal information table 2030, based on the SIP-URI included in the received call participant information request.

The 3PCC module part 2102 generates a call participant information request success response including the URI 2021, the acquired call state 2022 and the recv SDP information 2036 (1006), and sends the generated call participant information request success response to the SOAP control part 2101 (S37). The SOAP control part 2101 receives the call participant information request success response, and sends an SOAP get Call Participants Information Response (call participant information request success response) to the Web server 1 (S38, 1007). The SOAP get Call Participants Information Response includes the URI, the call state and the recv SDP information in the received call participant information request success response and is generated in accordance with the SOAP.

If the session ID included in the received call participant information request is not registered at step 1002, and the SIP-URI included in the received call participant information request is not registered at step 1004, the 3PCC module part 2102 generates a call participant information request failure response (error response message) (1008), and sends the generated call participant information request failure response to the SOAP control part 2101. The SOAP control part 2101 receives the call participant information request failure response, and sends the SOAP get Call Participants Information Response indicating the call participant information request failure to the Web server 1(1007).

Figure 11:
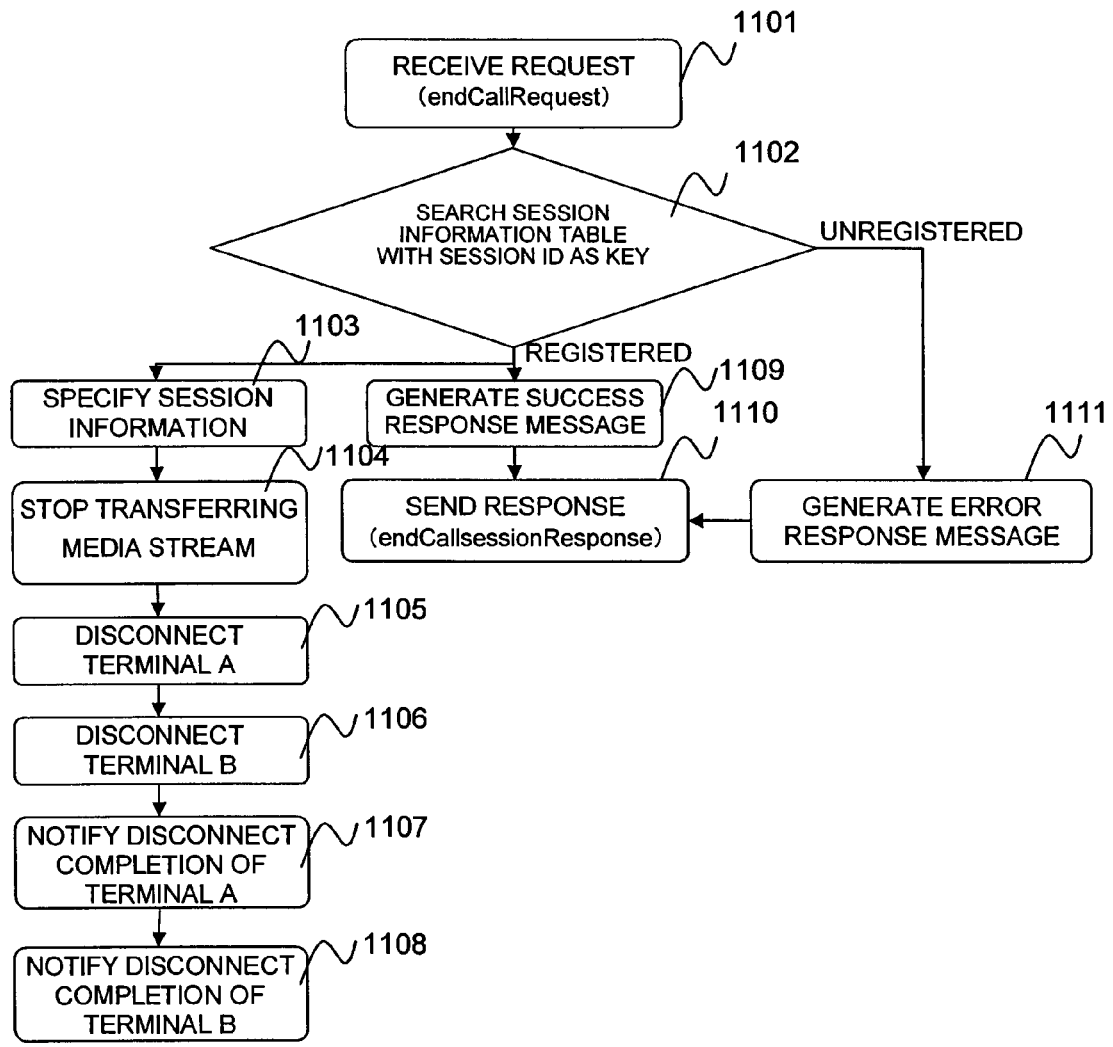
FIG. 11 is a flowchart for explaining the operation in receiving a call end request in the SOAP-SIP adapter 2 according to the first embodiment.
Figure 15:
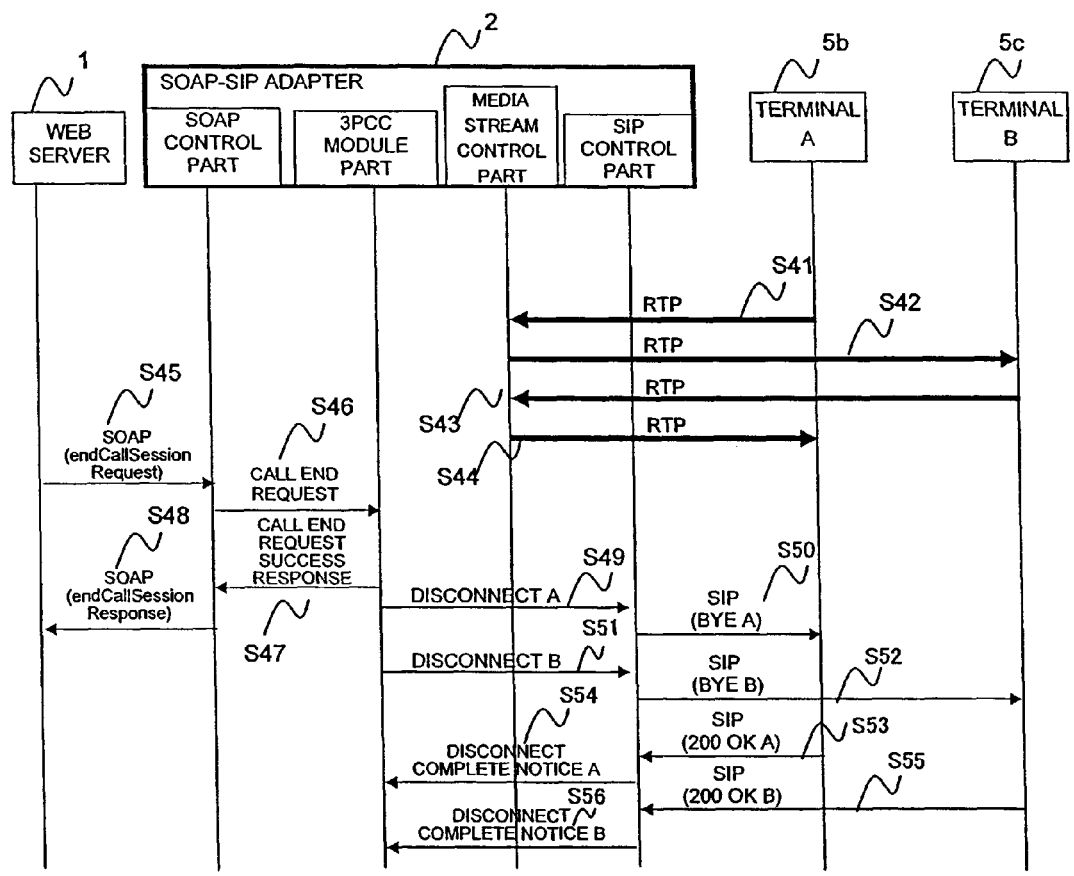
FIG. 15 is a sequence chart (4) for explaining the 3PCC service procedure according to the first embodiment.

FIG. 15 is a sequence chart (4) for explaining the 3PCC service procedure according to the first embodiment. FIG. 11 is a flowchart for explaining the operation in receiving a call end request in the SOAP-SIP adapter 2 according to the first embodiment.

Referring to FIGS. 15 and 11, the operation that the Web server 1 ends the call will be described below. The processings of steps S41 to S44 in FIG. 15 correspond to the processings of steps S16 to S19 as described above.

The Web server 1 sends an SOAP end Call Session Request (call end request) to the SOAP-SIP adapter 2 (S45). The SOAP end Call Session Request includes the session ID of the call to be ended. More specifically, the Web sever 1 generates the SOAP end Call Session Request including the session ID stored at step S4 as described above, and sends it to the SOAP-SIP adapter 2. As one example, the Web server 1 may select the session ID of the call to be ended from the session ID stored at step S4 as described above, based on the user operation from the terminal 5a.

The SOAP-SIP adapter 2 searches the session information table 2010 held in the SOAP-SIP adapter 2 with the session ID included in the SOAP end Call Session Request as the key, specifies the terminals 5b, 5c to be disconnected from the table information of the matched session ID 2011 and disconnects them (S46 to S56). The detailed operation of steps S46 to S56 in the SOAP-SIP adapter 2 will be described below.

The SOAP control part 2101 of the SOAP-SIP adapter 2 receives the SOAP end Call Session Request (call end request), and sends the call end request to the 3PCC module part 2102 (S46). This call end request includes the session ID in the SOAP end Call Session Request. The 3PCC module part 2102 receives the call end request (1101), and searches the session information table 2010 for the session ID 2011, based on the session ID included in the received call end request (1102).

If the session ID included in the received call end request is already registered in the session information table 2010, the 3PCC module part 2102 generates a call end request success response (1109), and sends the generated call end request success response to the SOAP control part 2101 (S47). The SOAP control part 2101 receives the call end request success response, and sends an SOAP end Call Session Response (call end request success response) to the Web server 1 (S48, 1110). For the Soap end Call Session Response, only the success response may be sent.

Also, the session information is specified by the pertinent session ID 2011 to specify the two parties (here the terminal A5b, terminal B5c) during the telephone communication (1103). For example, the 3PCC module part 2102 acquires the SIP-URI 2021 of each terminal A5b, terminal B5c by referring to the call participant information table 2020 corresponding to the session ID included in the received call end request. The media stream control part 2103 stops the transfer of media stream (1104). A media stream transfer stop request may be sent from the 3PCC module part 2102 to the media stream control part 2103.

The 3PCC module part 2102 sends a disconnect request (A) including the acquired SIP-URI to the SIP control part 2104 in accordance with one of the acquired SIP-URIs (S49, 1105). The SIP control part 2104 receives the disconnect request (A), and sends a BYE message (A) of the SIP to the terminal A5b with the SIP-URI included in the received disconnect request (A) as the To URI (S50).

Likewise, the 3PCC module part 2102 sends a disconnect request (B) including the acquired SIP-URI to the SIP control part 2104 in accordance with the other acquired SIP-URI (S51, 1106). The SIP control part 2104 receives the disconnect request (B), and sends a BYE message (B) to the terminal B5c with the SIP-URI included in the received disconnect request (B) as the To URI (S52).

The terminal A5b sends a 200 OK (A) for the BYE message (A) received at step S50 to the SOAP-SIP adapter 2 (S53). The SIP control part 2104 of the SOAP-SIP adapter 2 receives the 200 OK (A), and sends a disconnect complete notice (A) to the 3PCC module part 2102 (S54, 1107).

Likewise, the terminal B5c sends a 200 OK (B) for the BYE message (B) received at step S52 to the SOAP-SIP adapter 2 (S55). The SIP control part 2104 of the SOAP-SIP adapter 2 receives the 200 OK (B), and sends a disconnect complete notice (B) to the 3PCC module part 2102 (S56, 1108).

If the session ID included in the received call end request is not registered at step 1102, the 3PCC module part 2102 generates a call end request failure response (error response message) (1111), and sends the generated call end request failure response to the SOAP control part 2101. The SOAP control part 2101 receives the call end request failure response, and sends the SOAP end Call Session Response indicating the call end request failure to the Web server 1 (1110).

2. Second Embodiment (Network Configuration)

Figure 4:
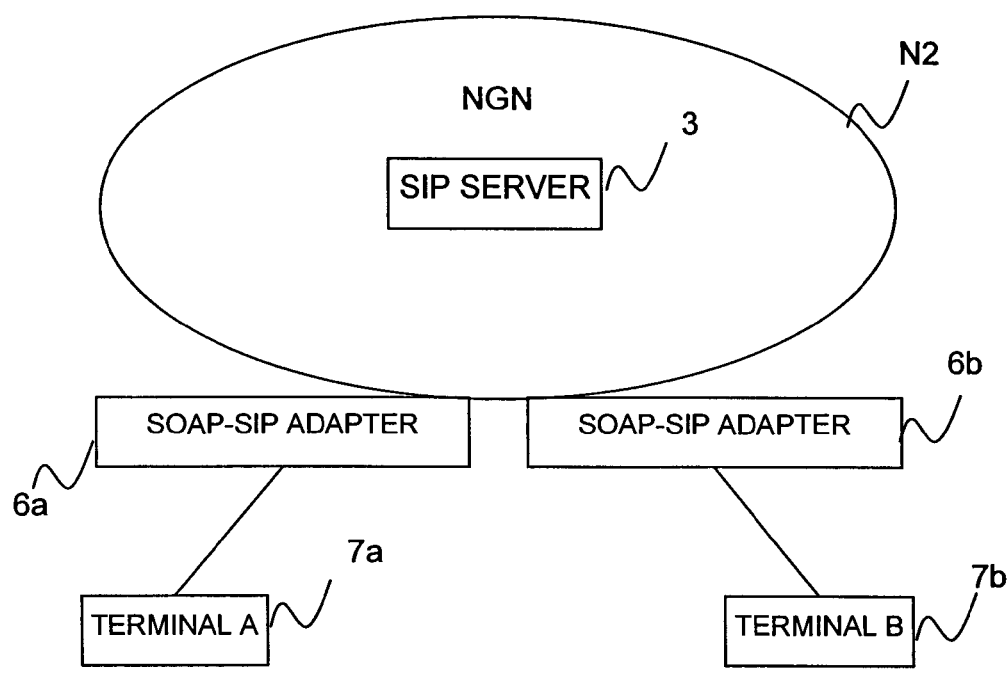
FIG. 4 is an explanatory view showing a configuration example of a communication network according to a second embodiment.

FIG. 4 is an explanatory view showing a configuration example of a communication network according to a second embodiment.

The communication network (system) of this embodiment comprises a SIP server 3 and an SOAP-SIP adapter 6a, 6b, for example. The SIP server 3 is installed in an NGN N2.

The SOAP-SIP adapter 6a communicates via the NGN N2 with the SOAP-SIP adapter 6b. Also, a terminal 7a and a terminal 7b communicate via the SOAP-SIP adapter 6a and the SOAP-SIP adapter 6b. It is predetermined which SOAP-SIP adapter 6 the terminal 7 is connected to, in which the SOAP-SIP adapter 6a and the terminal A7a correspond one to one, and the SOAP-SIP adapter 6b and the terminal B7b also correspond one to one. For example, to communicate with the terminal B7b, it is possible to communicate with the terminal B7b if the SOAP-SIP adapter 6b is designated. Also, the SOAP-SIP adapter 6 and the terminal 7 may correspond one to many, and the correspondence between the SOAP-SIP adapter 6 and the terminal 7 to be connected may be stored in an appropriate device.

Figure 5:
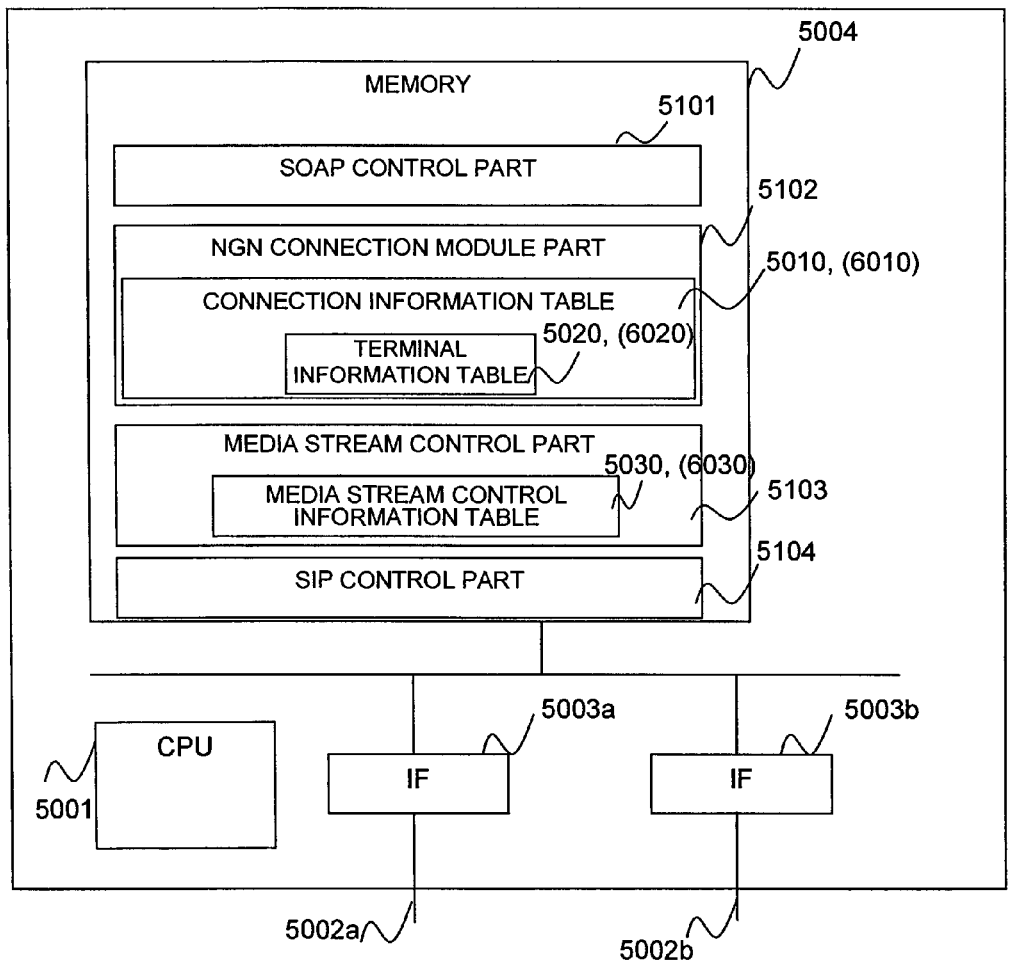
FIG. 5 is an explanatory view showing a configuration example of an SOAP-SIP adapter 6 according to the second embodiment.

FIG. 5 is an explanatory view showing a configuration example of the SOAP-SIP adapter 6 according to the second embodiment.

The SOAP-SIP adapter 6 of this embodiment comprises an NGN connection module part 5102, instead of the 3PCC module part 2102 of the first embodiment, for example. The NGN connection module part 5102 has a connection information table 5010, which has a terminal information table 5020. A CPU 5001, an IF 5003a, 5003b, an SOAP control part 5101, a media stream control part 5103, and a SIP control part 5104 are the same as those of the first embodiment.

Figure 6A:
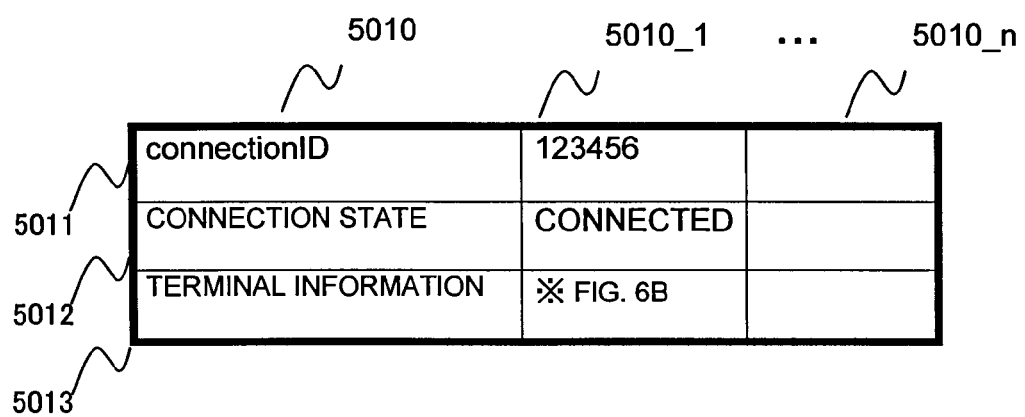
FIG. 6A is an explanatory view showing one example of the organization of a connection information table 5010 in the SOAP-SIP adapter 6a according to the second embodiment.

FIG. 6A is an explanatory view showing one example of the organization of the connection information table 5010 in the SOAP-SIP adapter 6a according to the second embodiment.

The connection information table 5010 stores, associated with a connection ID 5011, a connection state 5012 and the terminal information 5013, for example.

The connection ID 5011 is the information identifying the connection corresponding to the connection request from the terminal 7. For example, the connection in the Transmission Control Protocol (TCP) is identified. The connection ID 5011 is generated for each SOAP-SIP adapter 6. The connection state 5012 indicates the state of connection, corresponds to the session state 2012 of the first embodiment, for example, and stores the same state. The terminal information 5013 corresponds to the terminal information table 5020.

FIG. 6B is an explanatory view showing one example of the organization of the terminal information table 5020 in the SOAP-SIP adapter 6a according to the second embodiment.

The terminal information table 5020 stores a handle value 5021, a connection ID 5022, a terminal state 5023, the send SDP information 5024, the recv SDP information 5025, a From URI 5026 and a To URI 5027, for example.

The handle value 5021 is the information identifying the session of SIP between the SOAP-SIP adapter 6a and the SOAP-SIP adapter 6b. The connection ID 5022 corresponds to the connection ID 5011 in the connection information table 5010 as described above. The terminal state 5023 indicates the state of session between the SOAP-SIP adapter 6a and the SOAP-SIP adapter 6b. The terminal state 5023 is stored in the same state as the terminal state 2033 of the first embodiment, for example. The send SDP information 5024 includes the IP address and the port number of the SOAP-SIP adapter 6 itself, for example. In an example of the SOAP-SIP adapter 6a as shown in FIG. 6B, it includes the IP address (10.0.1.1) and the port number (10000) of the SOAP-SIP adapter 6a. The recv SDP information 5025 includes the IP address and the port number of the SOAP-SIP adapter 6 to be connected, for example. In the example of FIG. 6B, it includes the IP address (10.0.2.1) and the port number (20000) of the SOAP-SIP adapter 6*b*. The From URI 5026 indicates the SIP-URI of the SOAP-SIP adapter 6 itself, for example. In the example of FIG. 6B, it indicates the SIP-URI of the SOAP-SIP adapter 6*a*. The To URI 5027 indicates the SIP-URI of the SOAP-SIP adapter 6 to be connected, for example. In the example of FIG. 6B, it indicates the SIP-URI of the SOAP-SIP adapter 6*b*.

FIG. 6C is an explanatory view showing one example of the organization of the media stream control information table 5030 in the SOAP-SIP adapter 6*a* according to the second embodiment.

The media stream control information table 5030 of this embodiment stores a connection ID 5031, instead of the session ID 2041 of the first embodiment, for example.

The connection ID 5031 corresponds to the connection ID 5011 of the connection information table 5010. The other items, including a media stream sending/receiving IP address 5032, a media stream sending/receiving port number 5033, a partner IP address (1) 5034, a partner port number (1) 5035, a partner IP address (2) 5036, and a partner port number (2) 5037 are the same as those of the first embodiment. In the SOAP-SIP adapter 6*a* of this embodiment, the partner IP address (1) 5034 and the partner port number (1) 5035 store the IP address and the port number of the SOAP-SIP adapter 6*b*, and the partner IP address (2) 5036 and the partner port number (2) 5037 store the IP address and the port number of the terminal A7*a*. Also, the media stream sending/receiving IP address 5032 and the media stream sending/receiving port number 5033 store the IP address and the port number of the SOAP-SIP adapter 6*a* as in the first embodiment.

Figure 21A:
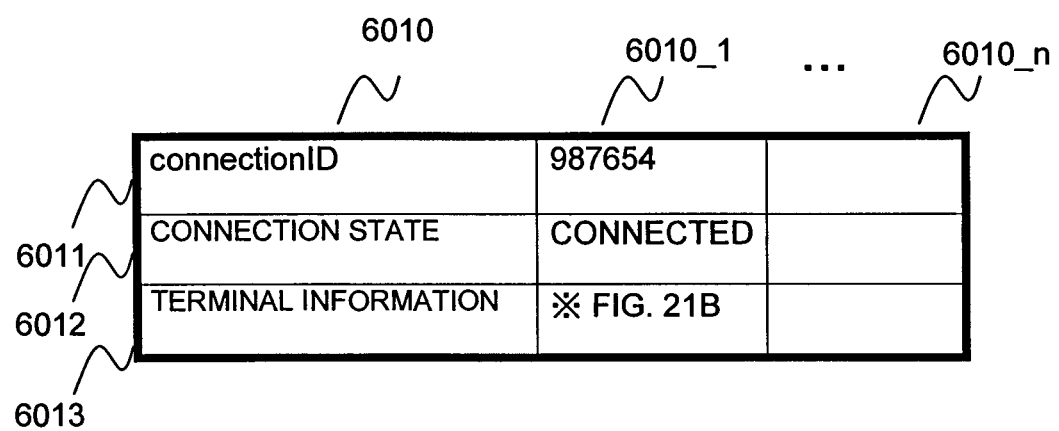
FIG. 21A is an explanatory view showing one example of the organization of a connection information table 6010 in the SOAP-SIP adapter 6a according to the second embodiment.
Figure 21B:
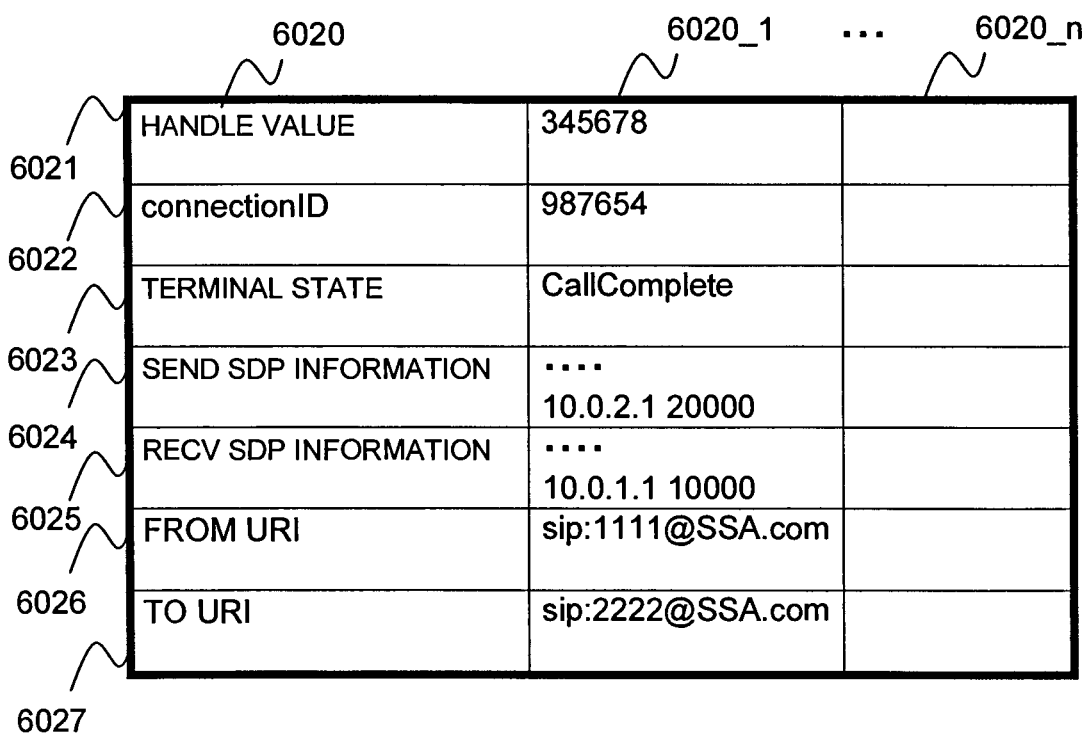
FIG. 21B is an explanatory view showing one example of the organization of a terminal information table 6020 in the SOAP-SIP adapter 6b according to the second embodiment.

FIG. 21A is an explanatory view showing one example of the organization of a connection information table 6010 in the SOAP-SIP adapter 6*b* according to the second embodiment. FIG. 21B is an explanatory view showing one example of the organization of a terminal information table 6020 in the SOAP-SIP adapter 6*b* according to the second embodiment. FIG. 21C is an explanatory view showing one example of the organization of a media stream control information table 6030 in the SOAP-SIP adapter 6*b* according to the second embodiment.

The organization of each table 6010, 6020, 6030 in the SOAP-SIP adapter 6*b* is the same as that of each table 5010, 5020, 5030 in the SOAP-SIP adapter 6*a* as described above.

In the terminal information table 6020 of the SOAP-SIP adapter 6*b*, the IP address and the port number of the SOAP-SIP adapter 6*b* are stored in the send SDP information 6024, and the IP address and the port number of the SOAP-SIP adapter 6*a* to be connected is stored in the recv SDP information 6025. Also, a From URI 6026 indicates the SIP-URI of the SOAP-SIP adapter 6*b* and a To URI 6027 indicates the SIP-URI of the SOAP-SIP adapter 6*a*.

Also, in the media stream control information table 6030, a partner IP address (1) 6034 and a partner port number (1) 6035 store the IP address and the port number of the SOAP-SIP adapter 6*a*, and a partner IP address (2) 6036 and a partner port number (2) 6037 store the IP address and the port number of the terminal B7*b*. A media stream sending/receiving IP address 6032 and a media stream sending/receiving port number 6033 store the IP address and the port number of the SOAP-SIP adapter 6*b*.

(Operation)

Figure 16:
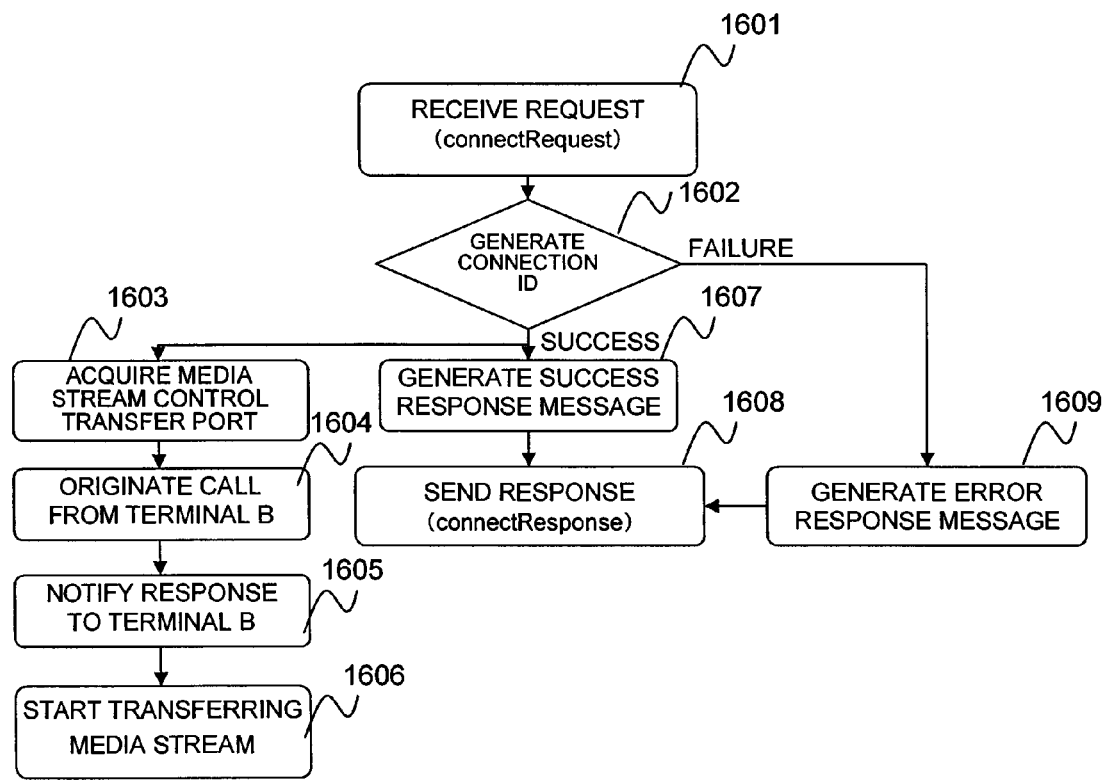
FIG. 16 is a flowchart for explaining the operation in receiving a connection start request in the SOAP-SIP adapter 6 according to the second embodiment.
Figure 17:
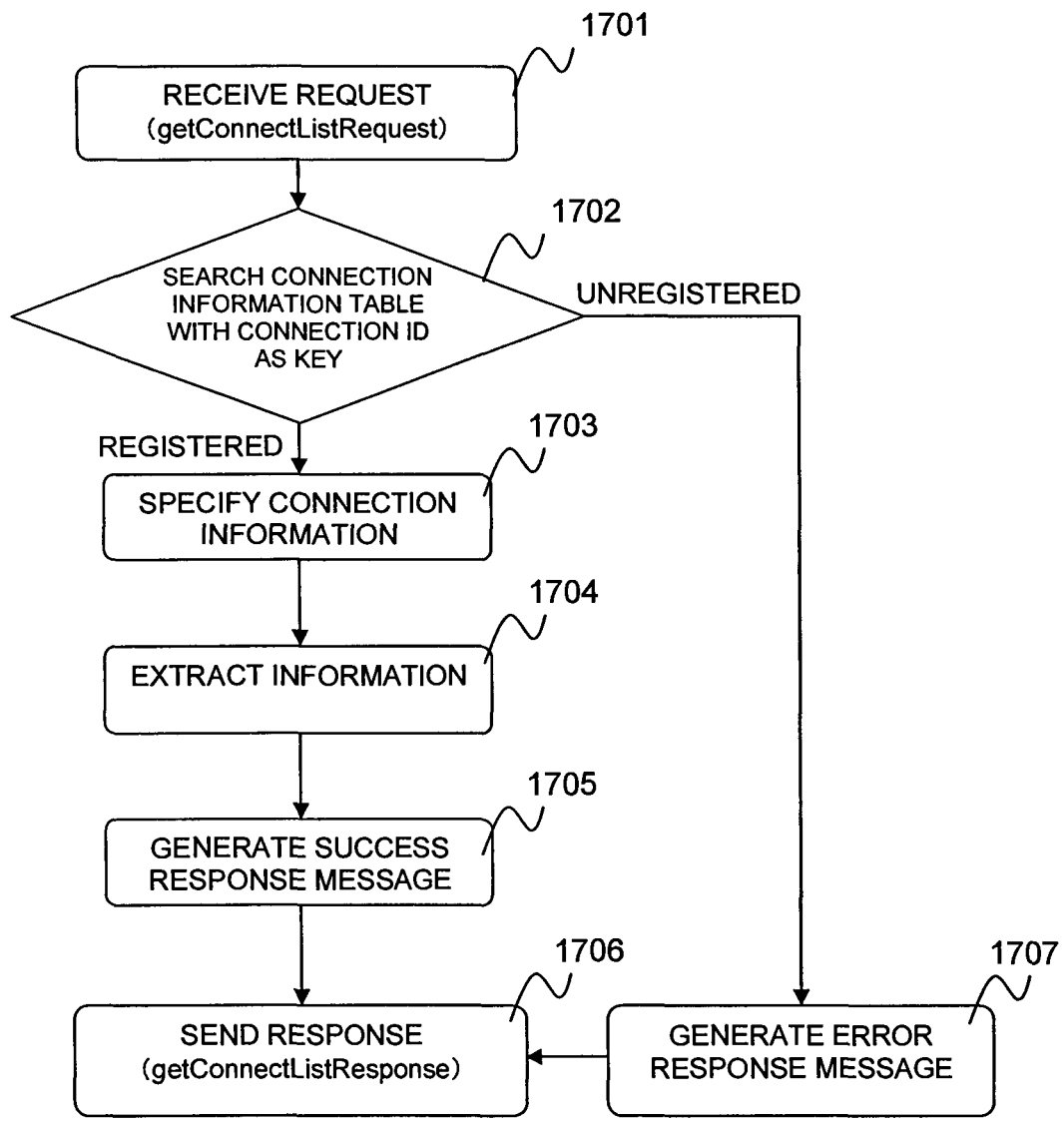
FIG. 17 is a flowchart for explaining the operation in receiving a connection information request in the SOAP-SIP adapter 6 according to the second embodiment.
Figure 19:
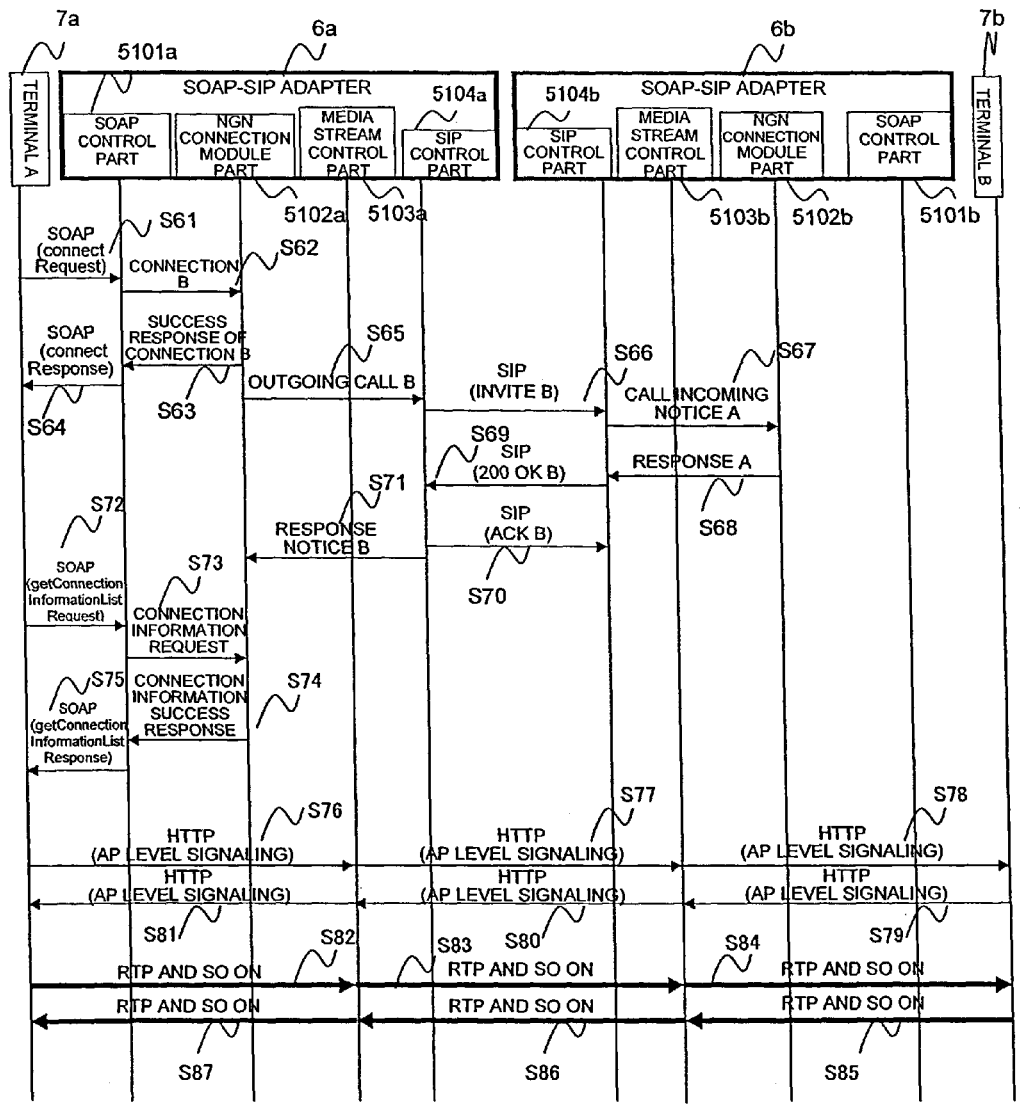
FIG. 19 is a sequence chart (1) for explaining an NGN connection service procedure according to the second embodiment.
Figure 22:
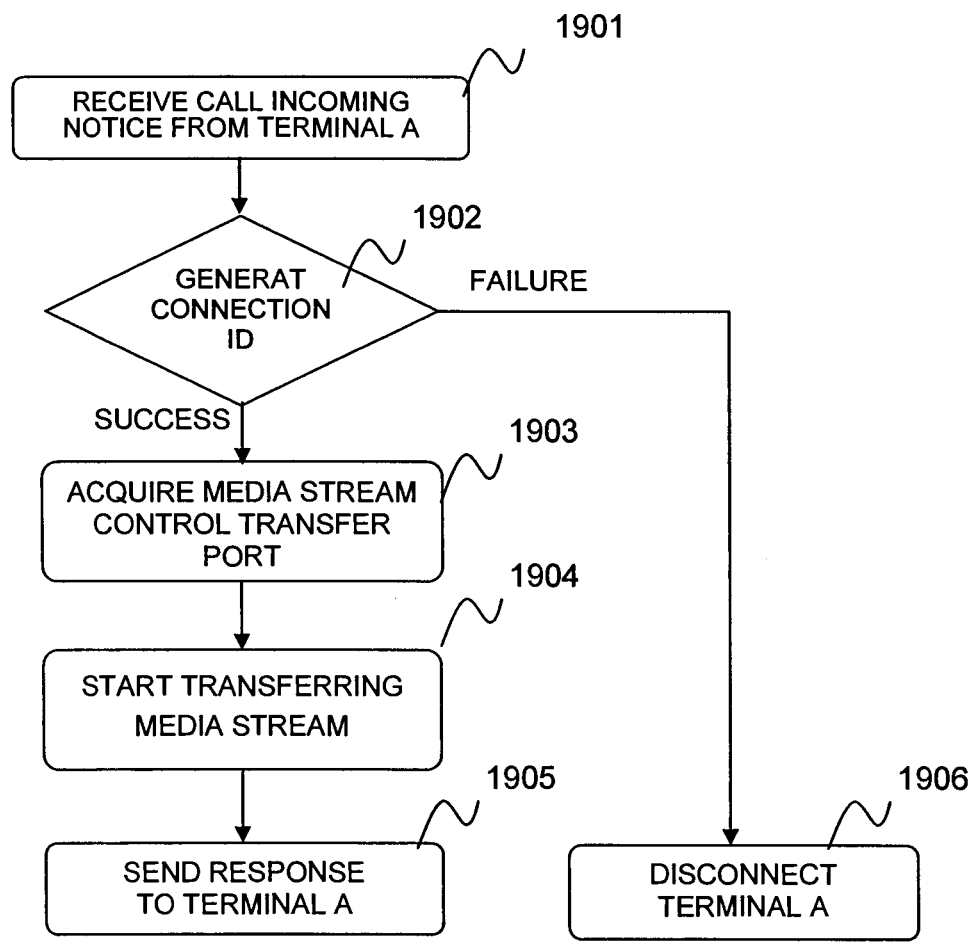
FIG. 22 is a flowchart for explaining the operation in receiving a call incoming notice in the SOAP-SIP adapter 6 according to the second embodiment.

FIG. 19 is a sequence chart (1) for explaining an NGN connection service procedure according to the second embodiment. FIG. 16 is a flowchart for explaining the operation in receiving a connection start request in the SOAP-SIP adapter 6 according to the second embodiment. FIG. 22 is a flowchart for explaining the operation in receiving a call incoming notice in the SOAP-SIP adapter 6 according to the second embodiment. FIG. 17 is a flowchart for explaining the operation in receiving a connection information request in the SOAP-SIP adapter 6 according to the second embodiment.

In this embodiment, it is possible to provide a service for connecting the self terminal and the other partner terminal on the NGN with the assured communication quality without being aware of the protocol of the SIP.

Most of the existent application terminals mount no SIP for reserving the communication band on the NGN, and have a problem that the communication on the NGN is impossible. In this embodiment, it is possible to reserve the communication band with the partner terminal B7*b* without being aware of the SIP by sending a connection start request SOAP message to the SOAP-SIP adapter 6 with a trigger of selecting the partner to be communicated on the screen of the terminal A7*a*, as one example. After reserving the communication band, the terminal 7 can make the communication on the reserved band through the already existent operation that is indifferent from the internet.

The operation that the terminal 7 starts the connection will be described below.

The terminal A7*a* connected to the SOAP-SIP adapter 6*a* opens (breaks) a queue port for the SOAP-SIP adapter 6*a* at the start up, for example. Thereby, sending and receiving the data between the terminal A7*a* and the SOAP-SIP adapter 6*a* is enabled. At this time, the SOAP-SIP adapter 6*a* receives the IP address and port number of the terminal A7*a*, and stores the received IP address and port number of the terminal A7*a* in the appropriate storage part. The terminal B7*b* and the SOAP-SIP adapter 6*b* have also the same configuration. The terminal 7 is not limited to the above example, but may open the queue port at an appropriate timing. The terminal A7*a* sends an SOAP connect Request (connection request) to the SOAP-SIP adapter 6*a* (S61). The SOAP connect Request includes the SIP-URI of the SOAP-SIP adapter 6*b* corresponding to the terminal B7*b* to be connected. For example, the terminal A7*a* may select the user identifier of the user or the SIP-URI of the SOAP-SIP adapter 6 to be connected from the appropriate input part, based on the user operation. In selecting the user identifier, for example, the terminal A7*a* may specify the SIP-URI of the SOAP-SIP adapter 6 corresponding to the input user identifier, because the user identifier and the SIP-URI of the SOAP-SIP adapter 6 to which the terminal 7 of the user is connected are associated and prestored. Also, a Web server in which the user identifier and the SIP-URI of the SOAP-SIP adapter 6 to which the user terminal 7 is connected are associated and prestored may be installed, and the Web server may return the SIP-URI of the SOAP-SIP adapter 6 corresponding to the user identifier selected at the terminal A7*a*.

The SOAP control part 5101*a* of the SOAP-SIP adapter 6*a* receives the SOAP connect Request, and sends a connection request (B) to the NGN connection module part 5102*a* of the SOAP-SIP adapter 6*a* (S62). This connection request (B) includes the SIP-URI in the SOAP connect Request. The SOAP-SIP adapter 6*a* starts the connection to this SIP-URI.

More specifically, first of all, the NGN connection module part 5102*a* receives the connection request (B) (1601), and generates the connection ID (1602). The generation of the connection ID is the same as in FIG. 7 and its description of the first embodiment. Referring to FIGS. 6A and 6B, this embodiment will be described below, although the explanation is partially duplicated with that of FIG. 7. The NGN connection module part 5102*a* stores the generated connection ID in the connection information table 5010 and the terminal information table 5020. The NGN connection module part 5102*a* sets the connection state 5012 of the connection information table 5010 to "Initial (initial state)". Further, the NGN connection module part 5102*a* stores the SIP-URI included in the received connection request (B) in the To URI 5027 of the terminal information table 5020.

Also, the NGN connection module part 5102*a* sets the terminal state 5023 of the terminal information table 5020 to "Initial (initial state)". The NGN connection module part 5102*a* stores the send SDP information 5024 including the IP address and the port number of the SOAP-SIP adapter 6*a* in the terminal information table 5020. Also, the NGN connection module part 5102*a* stores the SIP-URI of the SOAP-SIP adapter 6*a* in the From URI 5026 of the terminal information table 5020. The SIP-URI, the IP address and the port number of the SOAP-SIP adapter 6*a* are prestored in the appropriate storage part.

The NGN connection module part 5102*a* generates a connection success response (B) (1607), and sends the generated connection success response (B) to the SOAP control part 5101*a* (S63). The connection success response (B) includes the generated connection ID. The SOAP control part 5101*a* receives the connection success response (B), and sends an SOAP connect Response (connection success response) to the terminal A7*a* (S64, 1608). The SOAP connect Response includes the connection ID in the received connection success response (B), and is generated in accordance with the SOAP. The terminal A7*a* receives the SOAP connect Response, and stores the connection ID included in the received SOAP connect Response in the appropriate storage part.

If the generation of the connection ID fails at step 1602, the NGN connection module part 5102*a* generates a connection request failure response (error response message) (1609), and sends it to the SOAP control part 5101*a*. The SOAP control part 5101*a* receives the connection request failure response, and sends the SOAP connect Response indicating the connection request failure to the terminal A7*a* (1608).

Next, the SOAP-SIP adapter 6*a* establishes the session with the SOAP-SIP adapter 6*b*.

First of all, the NGN connection module part 5102*a* acquires a media stream control transfer port (1603). The NGN connection module part 5102*a* sends a call outgoing request (B) to the SIP control part 5104*a* of the SOAP-SIP adapter 6*a* (S65, 1604). The call outgoing request (B) includes the send SDP information 5024, the From URI 5026 and the To URI 5027 stored in the terminal information table 5020.

The SIP control part 5104*a* receives the call outgoing request (B), and sends an INVITE message (B) of the SIP to the SOAP-SIP adapter 6*b* in accordance with the To URI included in the received call outgoing request (B) (S66). The INVITE message (B) includes at least the send SDP information, the From URI, and the To URI in the received call outgoing request (B), for example. Also, the SIP control part 5104*a* generates the handle value identifying the session of the SIP with the SOAP-SIP adapter 6*b*.

The operation of each part in the SOAP-SIP adapter 6*b* will be described below.

The SIP control part 5104*b* of the SOAP-SIP adapter 6*b* receives the INVITE message (B), and sends a call incoming notice (A) to the NGN connection module part 5102*b* of the SOAP-SIP adapter 6*b* (S67). The call incoming notice (A) includes the send SDP information, the From URI and the To URI in the received INVITE message (B).

The NGN connection module part 5102*b* receives the call incoming notice (A) (1901), and generates the connection ID (1902). In this embodiment, the connection ID is generated independently in the SOAP-SIP adapter 6*a* and the SOAP-SIP adapter 6*b*. The generation of the connection ID is the same as at step 1602 as described above. The NGN connection module part 5102*b* stores the generated connection ID in the connection information table 6010 and the terminal information table 6020. The NGN connection module part 5102*b* sets the connection state 6012 of the connection information table 6010. For example, it sets the connection state 6012 to "Initial (initial state)" or "Connected (connected state)". The "Initial" or "Connected" may be changed at an appropriate timing. Moreover, the NGN connection module part 5102*b* stores the send SDP information included in the received call incoming notice (A) in the recv SDP information 6025 of the terminal information table 6020. The NGN connection module part 5102*b* stores the From URI included in the received call incoming notice (A) in the To URI 6027 of the terminal information table 6020, and similarly stores the To URI (i.e., its own SIP-URI) included in the received call incoming notice (A) in the From URI 6026.

Also, the NGN connection module part 5102*b* sets the terminal state 6023 of the terminal information table 6020. For example, it appropriately sets the terminal state 6023 to "Initial (initial state)" or "Call Complete (session established state)". The terminal state 6023 may be appropriately changed. The NGN connection module part 5102*b* stores the IP address and the port number of the SOAP-SIP adapter 6*b* in the send SDP information 6024 of the terminal information table 6020. The IP address and the port number of the SOAP-SIP adapter 6*b* are prestored in the appropriate storage part. Also, the SIP control part 5104*b* generates the handle value identifying the session of the SIP with the SOAP-SIP adapter 6*a* and stores it in the terminal information table 6020.

The NGN connection module part 5102*b* of the SOAP-SIP adapter 6*b* acquires the media stream control transfer port (1903). The NGN connection module part 5102*b* sends the generated connection ID, the IP address and port number of the SOAP-SIP adapter 6*a* included in the send SDP information in the received call incoming notice (A), and the IP address and port number of the terminal B7*b* stored by port open to the media stream control part 5103*b*. The media stream control part 5103*b* stores each received information in the media stream control information table 6030. For example, the media stream control part 5103*b* stores the received IP address and port number of the SOAP-SIP adapter 6*a* in the partner IP address (1) 6034 and the partner port number (1) 6035, and stores the received IP address and port number of the terminal B7*b* in the partner IP address (2) 6036 and the partner port number (2) 6037. Also, the media stream control part 5103*b* stores the received connection ID, and stores its own IP address and port number in the media stream sending/receiving IP address 6032 and the media stream sending/receiving port number 6033. Thereby, the SOAP-SIP adapter 6*b* can start the transfer of media stream (1904).

The NGN connection module part 5102*b* generates a response (A), and sends it to the SIP control part 5104*b* (S68, 1905). The response (A) includes the send SDP information 6024, the From URI 6026 and the To URI 6027 stored in the terminal information table 6020. The SIP control part 5104*b* receives the response (A), and sends a 200 OK (B) of the SIP to the SOAP-SIP adapter 6*a* (S69). The 200 OK (B) includes at least the send SDP information, the From URI and the To URI in the received response (A), for example.

If the generation of the connection ID fails at step 1902 as described above, the NGN connection module part 5102*b* disconnects the session of SIP with the SOAP-SIP adapter corresponding to the terminal A1*a* (1906).

Returning to the description of the SOAP-SIP adapter 6a, the SIP control part 5104a of the SOAP-SIP adapter 6a receives the 200 OK (B) and sends an ACK (B) of the SIP to the SOAP-SIP adapter 6b (S70). The SIP control part 5104a sends a response notice (B) to the NGN connection module part 5102a (S71, 1605). The response notice (B) includes the handle value generated at step S66 and the send SDP information included in the 200 OK (B) received at step S69. The NGN connection module part 5102a stores the handle value included in the received response notice (B) in the terminal information table 5020. Also, the NGN connection module part 5102a stores the send SDP information included in the received response notice (B) in the recv SDP information 5025 of the terminal information table 5020. The handle value may be stored at an appropriate timing. The NGN connection module part 5102a updates the terminal state 5023 of the terminal information table 5020 to "Call Complete (session established state)". Also, the NGN connection module part 5102a updates the connection state 5012 of the connection information table 5010 to "Connected (connected state)". The terminal state 2023 may be updated appropriately in sending or receiving the SIP message (e.g., 200 OK and so on).

The NGN connection module part 5102a sends the generated connection ID, the IP address and port number of the terminal A7a stored by port open, the IP address and port number of the SOAP-SIP adapter 6b included in the received send SDP information to the media stream control part 5103a. The media stream control part 5103a stores each received information in the media stream control information table 5030. For example, the media stream control part 5103a stores the received IP address and port number of the SOAP-SIP adapter 6b in the partner IP address (1) 5034 and the partner port number (1) 5035, and stores the received IP address and port number of the terminal A7a in the partner IP address (2) 5036 and the partner port number (2) 5037. Also, the media stream control part 5103a stores the received connection ID, and stores its own IP address and port number in the media stream sending/receiving IP address 5032 and the media stream sending/receiving port number 5033. Thereby, the SOAP-SIP adapter 6a can start the transfer of media stream (1606).

Next, the operation that the terminal 7 acquires the connection information will be described below.

The terminal A7a sends an SOAP get Connection Information List Request (connection information request) to the SOAP-SIP adapter 6a (S72). The SOAP get Connection Information List Request includes the connection ID of the connect information (connection information) to be acquired. More specifically, the terminal A7a generates the SOAP get Connection Information List Request including the connection ID stored at step S64 as described above. As one example, the terminal A7a periodically performs the processing at step S72 after receiving the SOAP connection Response at step S64.

The SOAP-SIP adapter 6a searches the connection information table 5010 held in the SOAP-SIP adapter 6a with the connection ID included in the SOAP get Connection Information List Request as the key, and sends an SOAP get Connection Information List Response including the table information of the matched connection ID 5011 (S73 to S75). The detailed operation of steps S73 to S75 in the SOAP-SIP adapter 6a will be described below.

First of all, the SOAP control part 5101a of the SOAP-SIP adapter 6a receives the SOAP get Connection Information List Request, and sends a connection information request to the NGN connection module part 5102a (S73). This connection information request includes the connection ID in the SOAP get Connection Information List Request.

The NGN connection module part 5102a receives the connection information request (1701), and searches the connection information table 5010 for the connection ID 5011, based on the connection ID included in the received connection information request (1702). If the connection ID included in the received connection information request is already registered in the connection information table 5010, the connection information corresponding to the pertinent connection ID 5011 is specified (1703). The NGN connection module part 5102a acquires the connection state 5012 corresponding to the pertinent connection ID 5011 (1704). The NGN connection module part 5102a is not limited to the connection state 5012, but may further acquire appropriate information stored in the connection information table 5010 and the terminal information table 5020.

The NGN connection module part 5102a generates a connection information success response including the acquired connection state 5012 (1705), and sends the generated connection information success response to the SOAP control part 5101a (S74). The SOAP control part 5101a receives the connection information success response, and sends an SOAP get Connection Information List Response to the terminal A7a (S75, 1706). The SOAP get Connection Information List Response includes the connection state in the received connection information success response, and is generated in accordance with the SOAP.

If the connection ID included in the received connection information request is not registered in the connection information table 5010 at step 1702, the NGN connection module part 5102a generates a connection information failure response (error response message) (1707), and sends the generated connection information failure response to the SOAP control part 5101a. The SOAP control part 5101a receives the connection information failure response, and sends the SOAP get Connection Information List Response indicating the connection information request failure to the terminal A7a (1706).

The terminal A7a receives the SOAP get Connection Information List Response, and can confirm the state of connection by referring to the connection state included in the received SOAP get Connection Information List Response. Thereby, if it is confirmed that the connection state is "Connected (connected state)", for example, terminal A7a and the terminal B7b start the signaling at the AP level in accordance with the HTTP (S76 to S81), and communicate the media stream in accordance with the RTP (S82 to S87).

The transfer of signal and media stream will be described below in connection with the media stream from the terminal A7a to the terminal B7b, for example. The terminal A7a sends the media stream from the sender with its own IP address and port number set to the destination with the IP address and port number of the SOAP-SIP adapter 6a set (S82). The IP address and the port number of the SOAP-SIP adapter 6a are prestored in the appropriate storage part.

The media stream control part 5103a of the SOAP-SIP adapter 6a transfers the received media stream to the SOAP-SIP adapter 6b by referring to the media stream control information table 5030 (S83). The transfer operation is the same as in the first embodiment. Referring to FIG. 6C, the SOAP-SIP adapter 6a of this embodiment will be described below. The sender IP address and port number of the received media stream are the IP address (192.168.10.1) and port number (30000) of the terminal A7a, whereby the corresponding partner IP address (1) 5034 (10.0.2.1) and port number (1) 5035 (20000) are acquired. The NGN connection module part 5102a transfers the received media stream to the SOAP-SIP adapter 6b in accordance with the acquired IP address and port number. Also, at this time, the NGN connection module part 5102a sets the media stream sending/receiving IP address 5032 and the media stream sending/receiving port number 5033 of the media stream control information table 5030 to the sender.

The media stream control part 5103b of the SOAP-SIP adapter 6b receives the media stream, and transfers a received signal to the terminal B7b by referring to the media stream control information table 6030 (S84). Referring to FIG. 21C, the SOAP-SIP adapter 6b of this embodiment will be described below. The sender IP address and port number of the received media stream are the IP address (10.0.1.1) and port number (10000) of the SOAP-SIP adapter 6a, whereby the corresponding partner IP address (2) 6036 (192.168.10.2) and port number (2) 6037 (40000) are acquired. The NGN connection module part 5102b transfers the received media stream to the terminal B7b in accordance with the acquired IP address and port number. Also, at this time, the NGN connection module part 5102b sets the media stream sending/receiving IP address 6032 and the media stream sending/receiving port number 6033 of the media stream control information table 6030 to the sender.

In the case of sending the media stream from the terminal B7b to the terminal A7a (S85 to S87), and the case of sending or receiving the signal at the AP level between the terminal A7a and the terminal B7b (S76 to S81), the operation is also made in the same manner.

As described above, it is possible to reserve the communication band with the partner terminal B7b without being aware of the SIP by sending a connection start request SOAP message to the SOAP-SIP adapter 6a with a trigger of selecting the partner to be communicated on the screen of the terminal A7a, as one example. After reserving the communication band, the terminal 7 can make the communication on the NGN N2 with the reserved band through the already existent operation that is indifferent from the internet. Also, the IP address establishing the signaling channel and the IP address establishing the data channel are the same.

Figure 18:
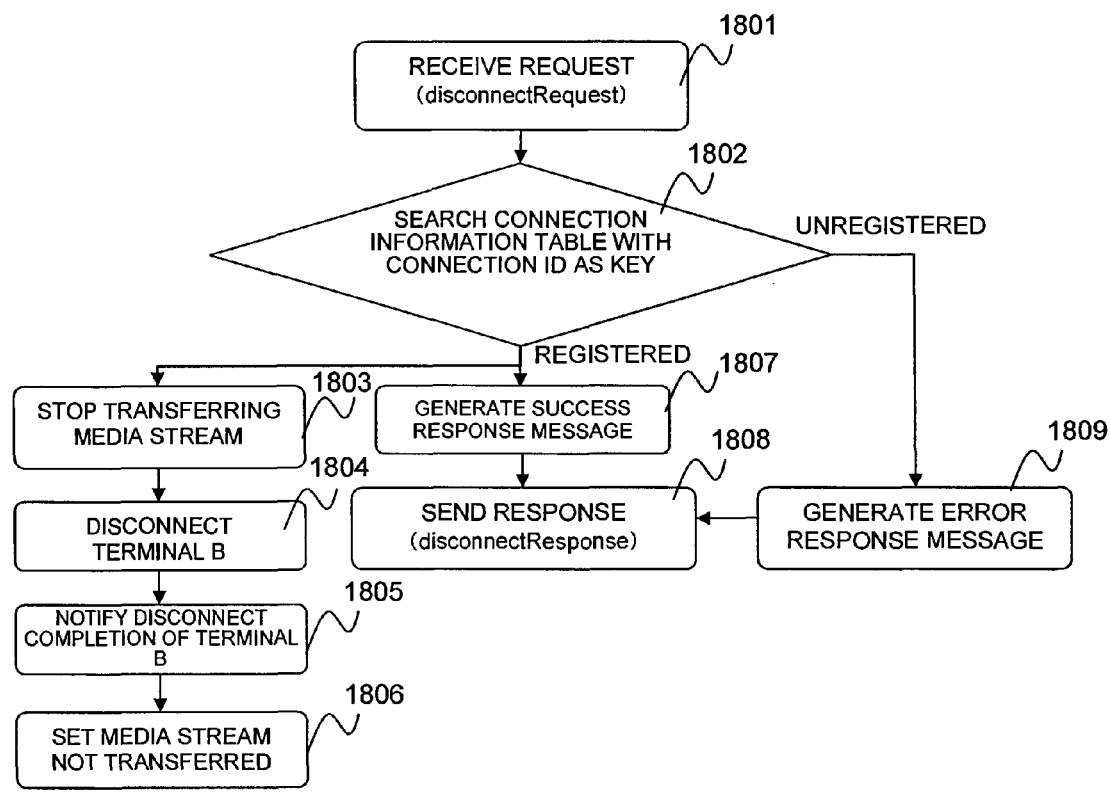
FIG. 18 is a flowchart for explaining the operation in receiving a connection end request in the SOAP-SIP adapter 6 according to the second embodiment.
Figure 20:
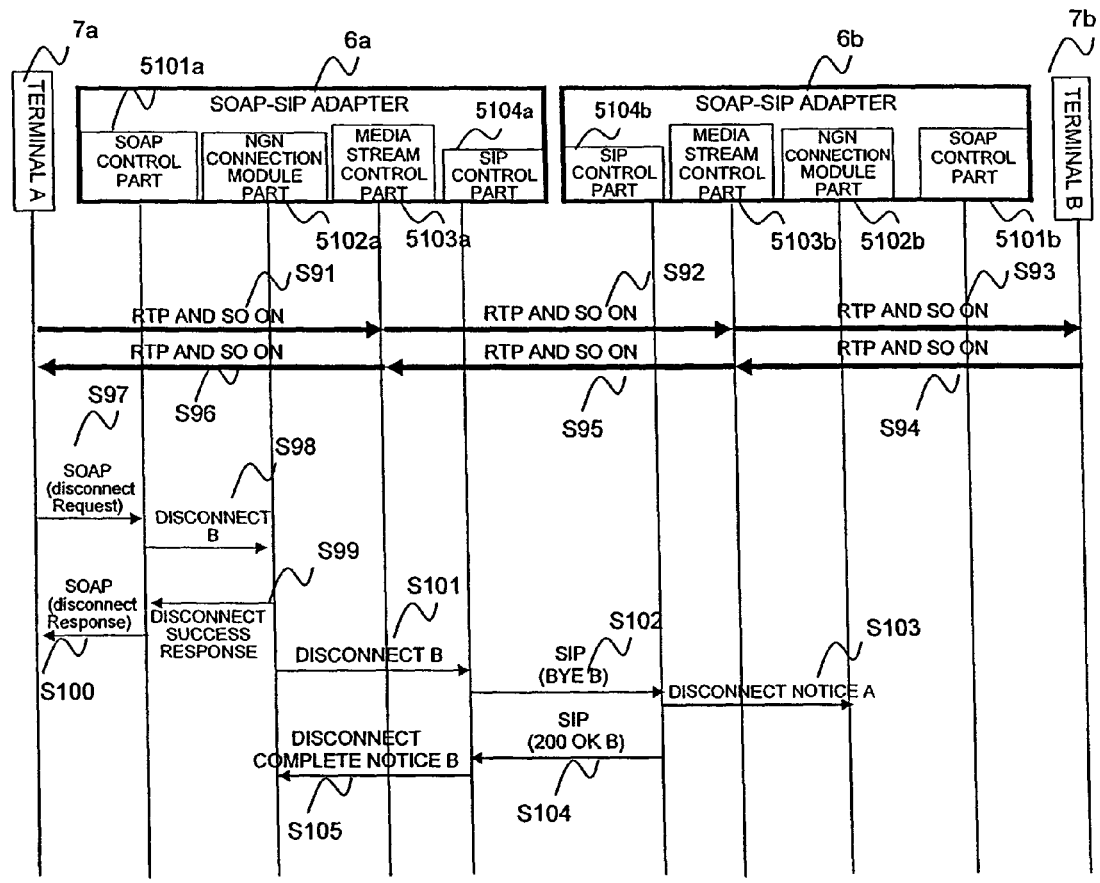
FIG. 20 is a sequence chart (2) for explaining the NGN connection service procedure according to the second embodiment.
Figure 23:
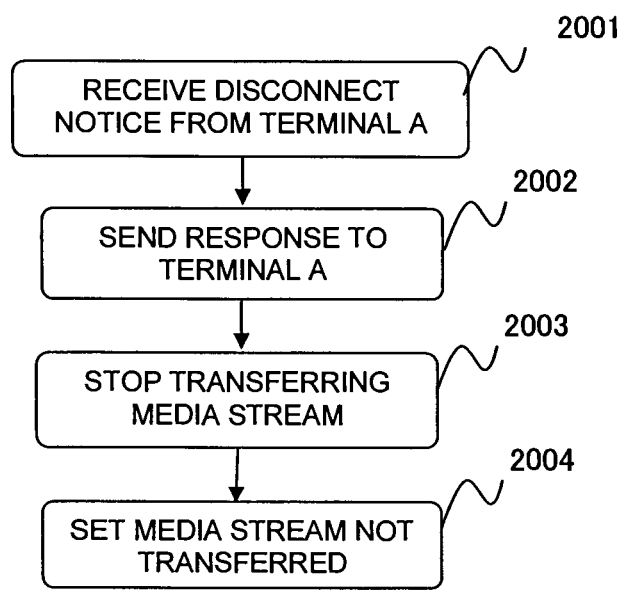
FIG. 23 is a flowchart for explaining the operation in receiving a disconnect notice in the SOAP-SIP adapter 6 according to the second embodiment.

FIG. 20 is a sequence chart (2) for explaining an NGN connection service procedure according to the second embodiment. FIG. 18 is a flowchart for explaining the operation in receiving a connection end request in the SOAP-SIP adapter 6 according to the second embodiment. FIG. 23 is a flowchart for explaining the operation in receiving a disconnect notice in the SOAP-SIP adapter 6 according to the second embodiment.

Referring to FIGS. 20, 18 and 23, the operation of ending the connection will be described below. The processings of steps S91 to S96 in FIG. 20 correspond to the processings of steps S82 to S87 as described above.

The terminal A7a sends an SOAP disconnect Request (disconnect request) to the SOAP-SIP adapter 6a (S97). The SOAP disconnect Request includes the connection ID of the call to end the connection. More specifically, the terminal A7a generates the SOAP disconnect Request including the connection ID stored at step S64 as described above. As one example, the terminal A7a may select the connection ID of the call to end the connection from the connection ID stored at step S64 as described above, based on the user operation from the appropriate input part.

The SOAP-SIP adapter 6a searches the connection information table 5010 held in the SOAP-SIP adapter 6a with the connection ID as the key, specifies the terminal 7 to be disconnected from the table information of the matched connection ID 5011, and disconnects it (S98 to S105). The detailed operation of steps S98 to S105 in the SOAP-SIP adapter 6a will be described below.

First of all, the SOAP control part 5101a of the SOAP-SIP adapter 6a receives the SOAP disconnect Request, and sends a disconnect request (B) to the NGN connection module part 5102a (S98). This disconnect request (B) includes the connection ID in the SOAP disconnect Request.

The NGN connection module part 5102a receives the disconnect request (1801), and searches the connection information table 5010 for the connection ID 5011, based on the connection ID included in the received disconnect request (B) (1802). If the connection ID included in the received disconnect request (B) is already registered in the connection information table 5010, the NGN connection module part 5102a generates a disconnect success response (1807), and sends the generated disconnect success response to the SOAP control part 5101a (S99). The SOAP control part 5101a receives the disconnect success response, and sends an SOAP disconnect Response to the terminal A7a (S100, 1808). For the SOAP disconnect Response, only the success response may be sent.

Also, the media stream control part 5103a stops the transfer of media stream (1803). The NGN connection module part 5102a may send a media stream transfer stop request to the media stream control part 5103a.

The NGN connection module part 5102a generates the disconnect request (B) and sends it to the SIP control part 5104a (S101, 1804). More specifically, the NGN connection module part 5102a acquires the To URI 5027 by referring to the terminal information table 5020 corresponding to the pertinent connection ID 5011. The NGN connection module part 5102a sends the disconnect request (B) including the acquired To URI 5027 to the SIP control part 5104a.

The SIP control part 5104a receives the disconnect request (B), and sends a BYE message (B) of the SIP to the SOAP-SIP adapter 6b in accordance with the To URI included in the received disconnect request (B) (S102). The SIP control part 5104b of the SOAP-SIP adapter 6b receives the BYE message (B) (2001), and sends a disconnect notice (A) to the NGN connection module part 5102b (S103). Also, the SIP control part 5104b sends a 200 OK (B) of the SIP to the SOAP-SIP adapter 6a (S104, 2002).

The media stream control part 5103b stops the transfer of media stream (2003), and sets the media stream not transferred (2004). The NGN connection module part 5102b may send a media stream transfer stop request to the media stream control part 5103b.

The SIP control part 5104a of the SOAP-SIP adapter 6a receives the 200 OK (B), and sends a disconnect complete notice (B) to the NGN connection module part 5102a (S105, 1805). The NGN connection module part 5102a receives the disconnect complete notice (B), and sets the media stream not transferred (1806).

If the session ID included in the received call end request is not registered at step 1802, the NGN connection module part 5102a generates a call end request failure response (error response message) (1809), and sends the generated call end request failure response to the SOAP control part 5101a.

The SOAP control part 5101a receives the call end request failure response, and sends the SOAP disconnect Response indicating the call end request failure to the terminal A7a (1808).

3. Others (Configuration Example in the First Embodiment)

According to the first embodiment, a communication system has, for example, a first server (SOAP-SIP adapter 2), a device (terminal B5c, Client B) for making an establishment of connection with said first server in a SIP protocol, and a first terminal (terminal A5b, Client A) for communicating with said first server, said first server comprises:

an interface (SOAP control part) for receiving a connection request message (SOAP makeCallSessionRequest);

a processing part (3PCC module part, SIP control part) for making the establishment of connection with said device in said SIP protocol in accordance with said received connection request message; and a first transfer control part (media stream control part) for transferring data received from said first terminal to said device after the establishment of connection by said processing part.

In the communication system described above, said device is a second terminal (terminal B5c, Client B), said communication system further comprises a second server (Web server 1) for sending said connection request message for communicating between said first terminal and said second terminal to said first server, said processing part makes the establishment of connection for said first terminal and said second terminal in said SIP protocol, and said first transfer processing part transfers the data received from said second terminal to said first terminal and the data received from said first terminal to said second terminal.

(Configuration Example in the Second Embodiment)

According to the second embodiment, a communication system has a first server (SOAP-SIP adapter 6a), a device (SOAP-SIP adapter 6b) for making an establishment of connection with said first server in a SIP protocol, and a first terminal (terminal A1a, Client A) for communicating with said first server, said first server comprises:

an interface (SOAP control part) for receiving a connection request message (SOAP connectRequest);

a processing part (3PCC module part, SIP control part) for making the establishment of connection with said device in said SIP protocol in accordance with said received connection request message; and a first transfer control part (media stream control part) for transferring data received from said first terminal to said device after the establishment of connection by said processing part.

The communication system described above further comprises a second terminal (terminal B7b, Client B), said device is a third server (SOAP-SIP adapter server 6b) having a second transfer processing part (media stream control part 5103b), and said second transfer processing part receives said data transferred from said first transfer control part and transfers said data to said second terminal The present invention is applicable to the network such as an NGN, for example.

What is claimed is:

1. A communication system having a first server, a first terminal configured to communicate with said first server, a second server, a second terminal configured to establish a connection with said first server in a SIP protocol, wherein said first server comprises:

an interface configured to receive a connection request message from the second server;

a processing part configured to:
  establish a connection between said first terminal and said second terminal in said SIP protocol in accordance with the received connection request message; and
  generate a session ID concerning a session between said first terminal and said second terminal based on said connection request message;

a storage part configured to store, associated with the session ID, a first session information including a first terminal IP address and a first terminal port number, a second session information including a second terminal IP address and a second terminal port number, a first server IP address and a first server port number; and a first control part configured to:
  receive data from said first terminal after establishment of the connection by said processing part, a destination of the data being set to the first server IP address and the first server port number, and a sender of the data being set to the first terminal IP address and the first terminal port number,
  acquire the second terminal IP address and the second terminal port number associated with the sender by referring to the storage part based on the sender; and
  transfer the data to the second terminal, the destination of the data being set to the second terminal IP address and the second terminal port number, and the sender of the data being set to the first server IP address and the first server port number.

2. The communication system according to claim 1, wherein:
  said second server further comprises an input part for accepting an input of said session ID, and
  said processing part is configured to:
    receive an information request including said session ID inputted by said input part via said interface from said second server,
    perform a search process for said storage part based on said session ID, and
    send the first and second session information corresponding to the session ID via said interface to said second server.

3. The communication system according to claim 1, wherein:
  said storage part is configured to store said first session information associated with a SIP-URI of an user of said first terminal and said second session information associated with the SIP-URI of the user of said second terminal,
  said second server further comprises an input part for accepting an input of said session ID and said SIP-URI, and
  said processing part is configured to:
    receive an information request including said session ID and said SIP-URI inputted by said input part via said second interface from said second server,
    perform a search process for said storage part based on said session ID and said SIP-URI, and
    send the first session information or second session information corresponding to the session ID and SIP-URI via said interface to said second server.

4. The communication system according to claim 1, wherein said first server sends a connection maintaining message to said first terminal or said second terminal after said processing part establishes the connection for said first terminal or said second terminal.

5. The communication system according to claim 1, wherein said second server further comprises an input part for accepting an input of said session ID, and
    wherein said processing part is configured to:
        receive a disconnect request including said session ID inputted by said input part via said interface from said second server, and
        set a disconnection of said first terminal and/or said second terminal in said SIP protocol for the session corresponding to said session ID.

6. The communication system according to claim 1, wherein:
    said processing part is configured to notify the first terminal and the second terminal of the address information of said first server in establishing the connection for said first terminal and said second terminal, and
    said first terminal and said second terminal are configured to send the data to said first server with the notified address information as the destination.

\* \* \* \* \*